(12) United States Patent
Batcher et al.

(10) Patent No.: US 12,609,821 B2
(45) Date of Patent: Apr. 21, 2026

(54) INDUSTRIAL AUTOMATION BLOCKCHAIN DATA MANAGEMENT

(71) Applicant: Rockwell Automation Technologies, Inc., Mayfield Heights, OH (US)

(72) Inventors: Kenneth W. Batcher, Hudson, OH (US); Sharath Chander Reddy Baddam, Twinsburg, OH (US); Juergen K. Weinhofer, Chagrin, OH (US); Timothy S. Biernat, Franklin, WI (US); David A. Vasko, Hartland, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 569 days.

(21) Appl. No.: 17/937,002

(22) Filed: Sep. 30, 2022

(65) Prior Publication Data

US 2024/0113872 A1 Apr. 4, 2024

(51) Int. Cl.
| | |
|---|---|
| *H04L 9/08* | (2006.01) |
| *H04L 9/00* | (2022.01) |
| *H04L 9/30* | (2006.01) |

(52) U.S. Cl.
CPC ............... H04L 9/088 (2013.01); H04L 9/30 (2013.01); H04L 9/50 (2022.05)

(58) Field of Classification Search
CPC ... H04L 9/088; H04L 9/30; H04L 9/50; H04L 9/3239; G06Q 2220/00; G06Q 10/10
See application file for complete search history.

(56) References Cited

U.S. PATENT DOCUMENTS

| | | | |
|---|---|---|---|
| 2003/0046675 A1 | 3/2003 | Cheng et al. | |
| 2007/0299747 A1 | 12/2007 | Shorter et al. | |
| 2017/0331896 A1* | 11/2017 | Holloway | H04L 67/04 |
| 2019/0339668 A1* | 11/2019 | Biernat | G06F 16/248 |
| 2019/0340269 A1* | 11/2019 | Biernat | H04L 9/3239 |
| 2019/0340716 A1 | 11/2019 | Cella | |
| 2020/0053128 A1* | 2/2020 | Bhosale | H04L 9/0891 |

(Continued)

FOREIGN PATENT DOCUMENTS

| | | |
|---|---|---|
| CN | 114386917 A | 4/2022 |
| EP | 3 564 881 A1 | 11/2019 |

(Continued)

OTHER PUBLICATIONS

U.S. Appl. No. 17/936,999, filed Sep. 30, 2022, 68 pages.

(Continued)

*Primary Examiner* — Trong H Nguyen
(74) *Attorney, Agent, or Firm* — Amin, Turocy & Watson, LLP

(57) ABSTRACT

Industrial automation blockchain data management (e.g., using a computerized tool) is enabled. For example, a system can comprise: a transfer component that, using a defined conversion algorithm, converts first data from a first industrial blockchain to second data applicable to a second industrial blockchain, other than the first industrial blockchain, a blockchain component that writes the second data to the second industrial blockchain, and a user interface component that renders an output indicative of the writing of the second data to the second industrial blockchain.

20 Claims, 24 Drawing Sheets

(56) References Cited

U.S. PATENT DOCUMENTS

| | | | | |
|---|---|---|---|---|
| 2020/0211005 | A1* | 7/2020 | Bodorik ................... | G06F 9/54 |
| 2020/0225649 | A1 | 7/2020 | Cahill | |
| 2020/0228316 | A1 | 7/2020 | Cahill | |
| 2020/0349564 | A1* | 11/2020 | Padmanabhan ..... | G06F 16/1824 |
| 2021/0334876 | A1* | 10/2021 | Trim .................. | G06Q 30/0627 |
| 2022/0230169 | A1* | 7/2022 | Stollman .............. | G06Q 20/401 |
| 2022/0271956 | A1 | 8/2022 | Hung et al. | |
| 2023/0410101 | A1* | 12/2023 | Chan ....................... | H04L 63/00 |

FOREIGN PATENT DOCUMENTS

| | | | | |
|---|---|---|---|---|
| KR | 20200139335 | A | * | 12/2020 |
| KR | 20210030163 | A | * | 3/2021 |

OTHER PUBLICATIONS

Extended European Search Report received for European Patent Application Serial No. 23187512.1 dated Feb. 14, 2024, 9 pages.

Communication Pursuant to Rule 69 EPC received for European Patent Application Serial No. 23187512.1 dated Apr. 8, 2024, 2 pages.

Extended European Search Report received for European Patent Application Serial No. 23187791.1 dated Feb. 14, 2024, 10 pages.

Communication Pursuant to Rule 69 EPC received for European Patent Application Serial No. 23187791.1 dated Apr. 8, 2024, 2 pages.

Non-Final Office Action received for U.S. Appl. No. 17/936,999 dated Mar. 21, 2025, 39 pages.

Final Office Action received for U.S. Appl. No. 17/936,999 dated Jul. 21, 2025, 35 pages.

Notice of Allowance received for U.S. Appl. No. 17/936,999 dated Sep. 18, 2025, 15 pages.

Omar et al., "Enhancing Vendor Managed Inventory Supply Chain Operations Using Blockchain Smart Contracts," in IEEE Access, vol. 8, 2020, pp. 182704-182719.

Sun et al., "Potential Requirements and Opportunities of Blockchain-Based Industrial IoT in Supply Chain: A Survey," in IEEE Transactions on Computational Social Systems, vol. 9, No. 5, Oct. 2022, pp. 1469-1483.

Omar et al., "Supply Chain Inventory Sharing Using Ethereum Blockchain and Smart Contracts," in IEEE Access, vol. 10, 2022, pp. 2345-2356.

* cited by examiner

**BLOCKCHAIN ECOSYSTEM
(SUPPLY CHAIN)**

800

802 —— STORES DATA REPRESENTATIVE OF AN OUTPUT OF AN INDUSTRIAL AUTOMATION DEVICE TO AN INDUSTRIAL BLOCKCHAIN

804 ——

NO — OUTPUT SATISFIES SMART CONTRACT ?

YES

806 —— IN RESPONSE TO THE OUTPUT SATISFYING A SMART CONTRACT STORED ON THE INDUSTRIAL BLOCKCHAIN, FACILITATING EXECUTION OF AN ELEMENT OF THE SMART CONTRACT

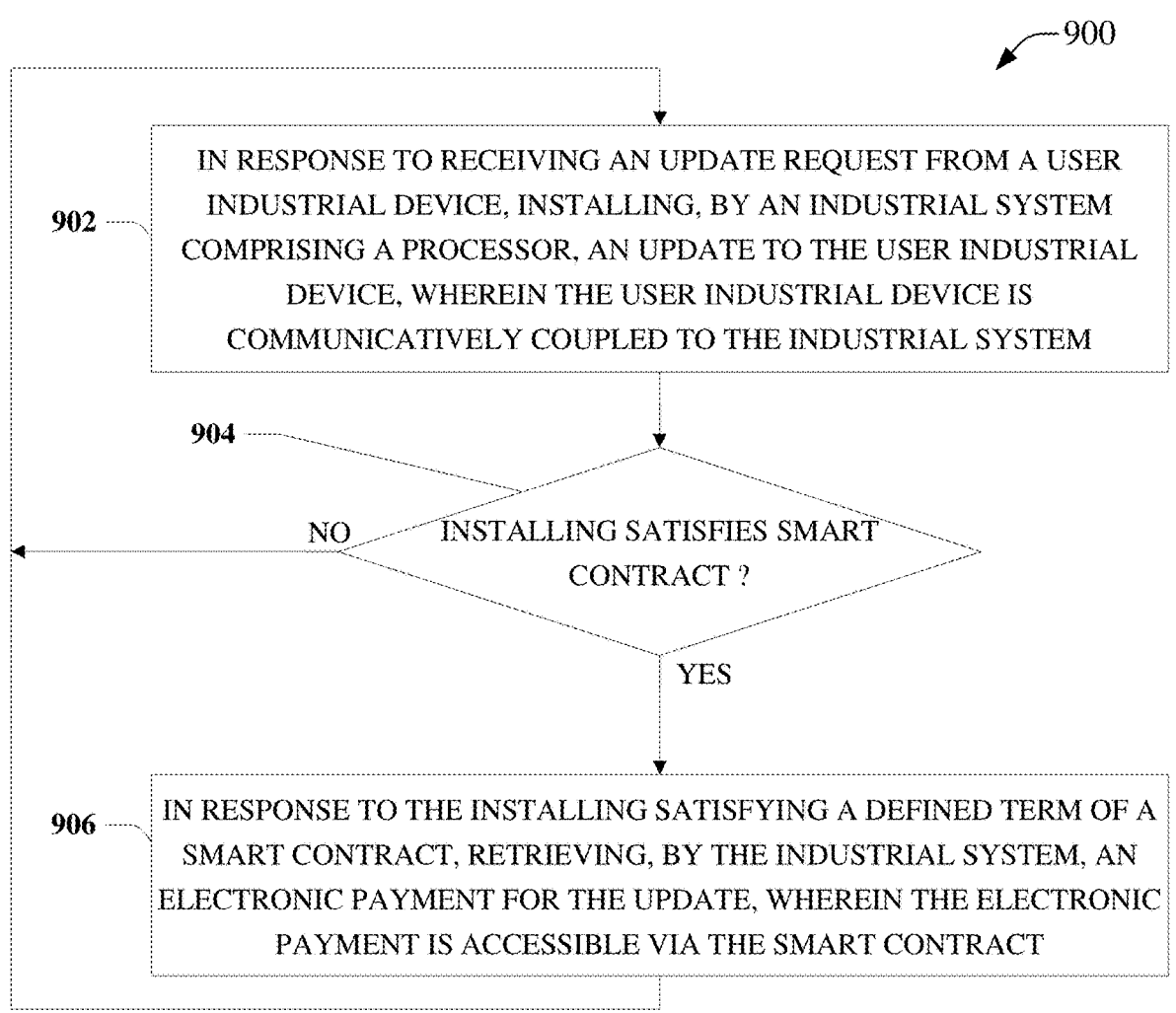

IN RESPONSE TO RECEIVING AN UPDATE REQUEST FROM A USER INDUSTRIAL DEVICE, INSTALLING, BY AN INDUSTRIAL SYSTEM COMPRISING A PROCESSOR, AN UPDATE TO THE USER INDUSTRIAL DEVICE, WHEREIN THE USER INDUSTRIAL DEVICE IS COMMUNICATIVELY COUPLED TO THE INDUSTRIAL SYSTEM

INSTALLING SATISFIES SMART CONTRACT ?

NO

YES

IN RESPONSE TO THE INSTALLING SATISFYING A DEFINED TERM OF A SMART CONTRACT, RETRIEVING, BY THE INDUSTRIAL SYSTEM, AN ELECTRONIC PAYMENT FOR THE UPDATE, WHEREIN THE ELECTRONIC PAYMENT IS ACCESSIBLE VIA THE SMART CONTRACT

FIG. 9

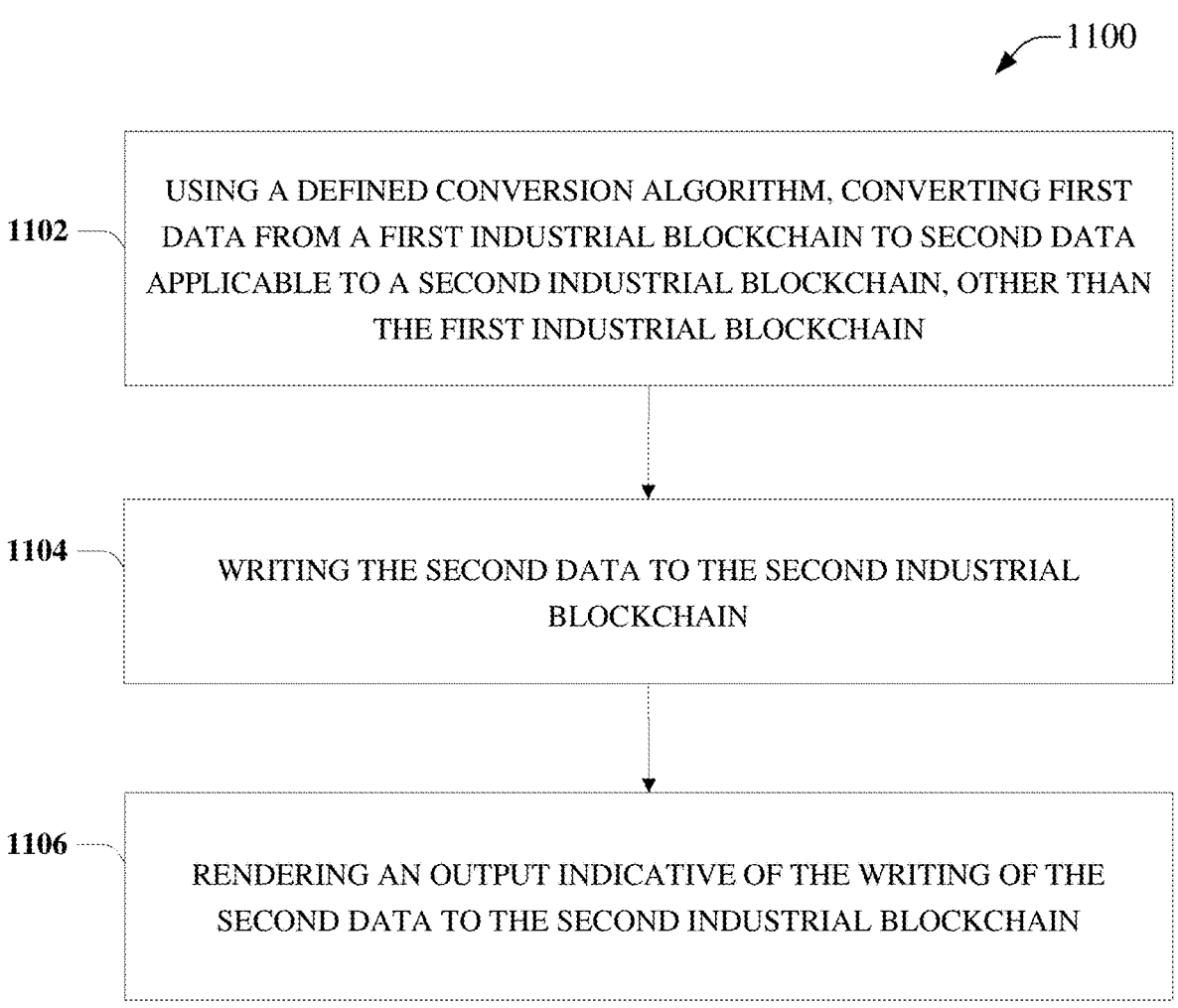

1100

1102 — USING A DEFINED CONVERSION ALGORITHM, CONVERTING FIRST DATA FROM A FIRST INDUSTRIAL BLOCKCHAIN TO SECOND DATA APPLICABLE TO A SECOND INDUSTRIAL BLOCKCHAIN, OTHER THAN THE FIRST INDUSTRIAL BLOCKCHAIN

1104 — WRITING THE SECOND DATA TO THE SECOND INDUSTRIAL BLOCKCHAIN

1106 — RENDERING AN OUTPUT INDICATIVE OF THE WRITING OF THE SECOND DATA TO THE SECOND INDUSTRIAL BLOCKCHAIN

FIG. 11

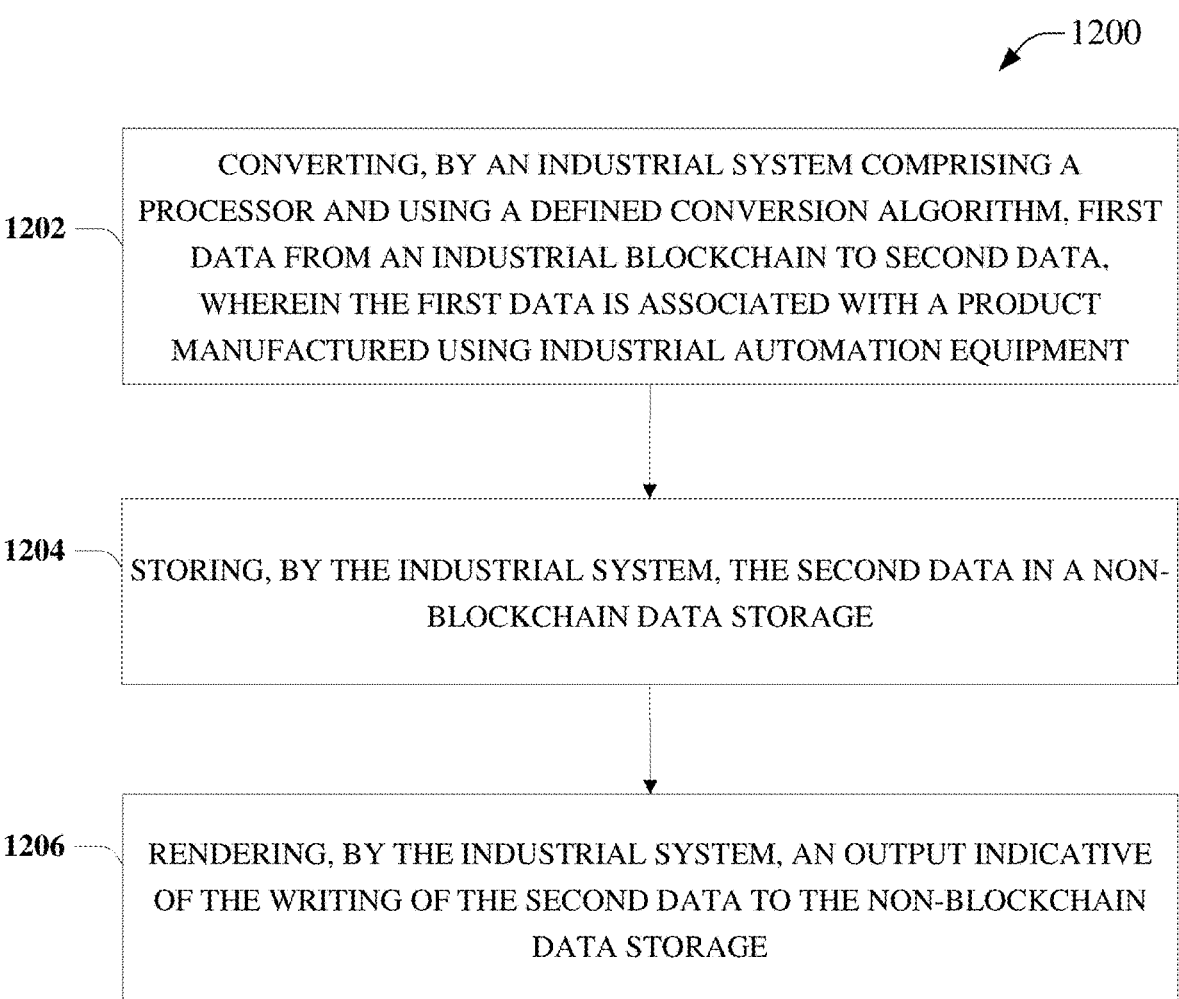

1200

1202 — CONVERTING, BY AN INDUSTRIAL SYSTEM COMPRISING A PROCESSOR AND USING A DEFINED CONVERSION ALGORITHM, FIRST DATA FROM AN INDUSTRIAL BLOCKCHAIN TO SECOND DATA, WHEREIN THE FIRST DATA IS ASSOCIATED WITH A PRODUCT MANUFACTURED USING INDUSTRIAL AUTOMATION EQUIPMENT

1204 — STORING, BY THE INDUSTRIAL SYSTEM, THE SECOND DATA IN A NON-BLOCKCHAIN DATA STORAGE

1206 — RENDERING, BY THE INDUSTRIAL SYSTEM, AN OUTPUT INDICATIVE OF THE WRITING OF THE SECOND DATA TO THE NON-BLOCKCHAIN DATA STORAGE

1302 —— IN RESPONSE TO RECEIVING A BLOCKCHAIN QUERY REQUEST, DETERMINING A DATA CLASSIFICATION APPLICABLE TO THE BLOCKCHAIN QUERY REQUEST

1304 —— BASED ON THE BLOCKCHAIN QUERY REQUEST, QUERYING AN INDUSTRIAL BLOCKCHAIN APPLICABLE TO THE DATA CLASSIFICATION

1306 —— RENDERING AN OUTPUT REPRESENTATIVE OF A RESULT OF THE QUERYING OF THE INDUSTRIAL BLOCKCHAIN

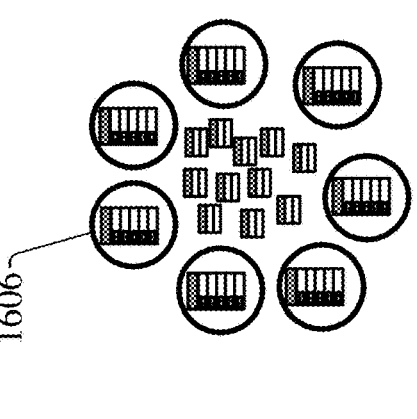
1606
1604
2106
2102
{logic}
Gas
2104
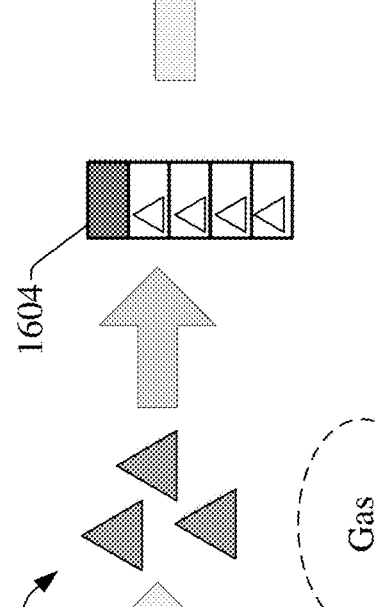
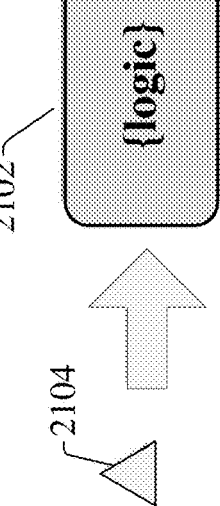
FIG. 21

INDUSTRIAL AUTOMATION BLOCKCHAIN DATA MANAGEMENT

BACKGROUND

The subject matter disclosed herein relates generally to industrial automation systems and, more particularly, industrial automation blockchain data management.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

According to an embodiment, a system can comprise: a memory that stores executable components, and a processor, operatively coupled to the memory, that executes the executable components, the executable components comprising: a transfer component that, using a defined conversion algorithm, converts first data from a first industrial blockchain to second data applicable to a second industrial blockchain, other than the first industrial blockchain, a blockchain component that writes the second data to the second industrial blockchain, and a user interface component that renders an output indicative of the writing of the second data to the second industrial blockchain.

In another embodiment, a method can comprise: converting, by an industrial system comprising a processor and using a defined conversion algorithm, first data from an industrial blockchain to second data, wherein the first data is associated with a product manufactured using industrial automation equipment, storing, by the industrial system, the second data in a non-blockchain data storage, and rendering, by the industrial system, an output indicative of the writing of the second data to the non-blockchain data storage.

In yet another embodiment, a non-transitory computer-readable medium can have stored thereon instructions that, in response to execution, cause an industrial device comprising a processor to perform operations, the operations comprising: in response to receiving a blockchain query request, determining a data classification applicable to the blockchain query request, based on the blockchain query request, querying an industrial blockchain applicable to the data classification, and rendering an output representative of a result of the querying of the industrial blockchain.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 9 is a block flow diagram of a process associated with performance-based smart contracts in industrial automation in accordance with one or more embodiments described herein.

FIG. 11 is a block flow diagram of a process associated with industrial automation blockchain data management in accordance with one or more embodiments described herein.

FIG. 12 is a block flow diagram of a process associated with industrial automation blockchain data management in accordance with one or more embodiments described herein.

FIG. 21 is a generalized diagram illustrating implementation of smart contracts within a blockchain-driven system in accordance with one or more embodiments described herein.

DETAILED DESCRIPTION

Figure 1:
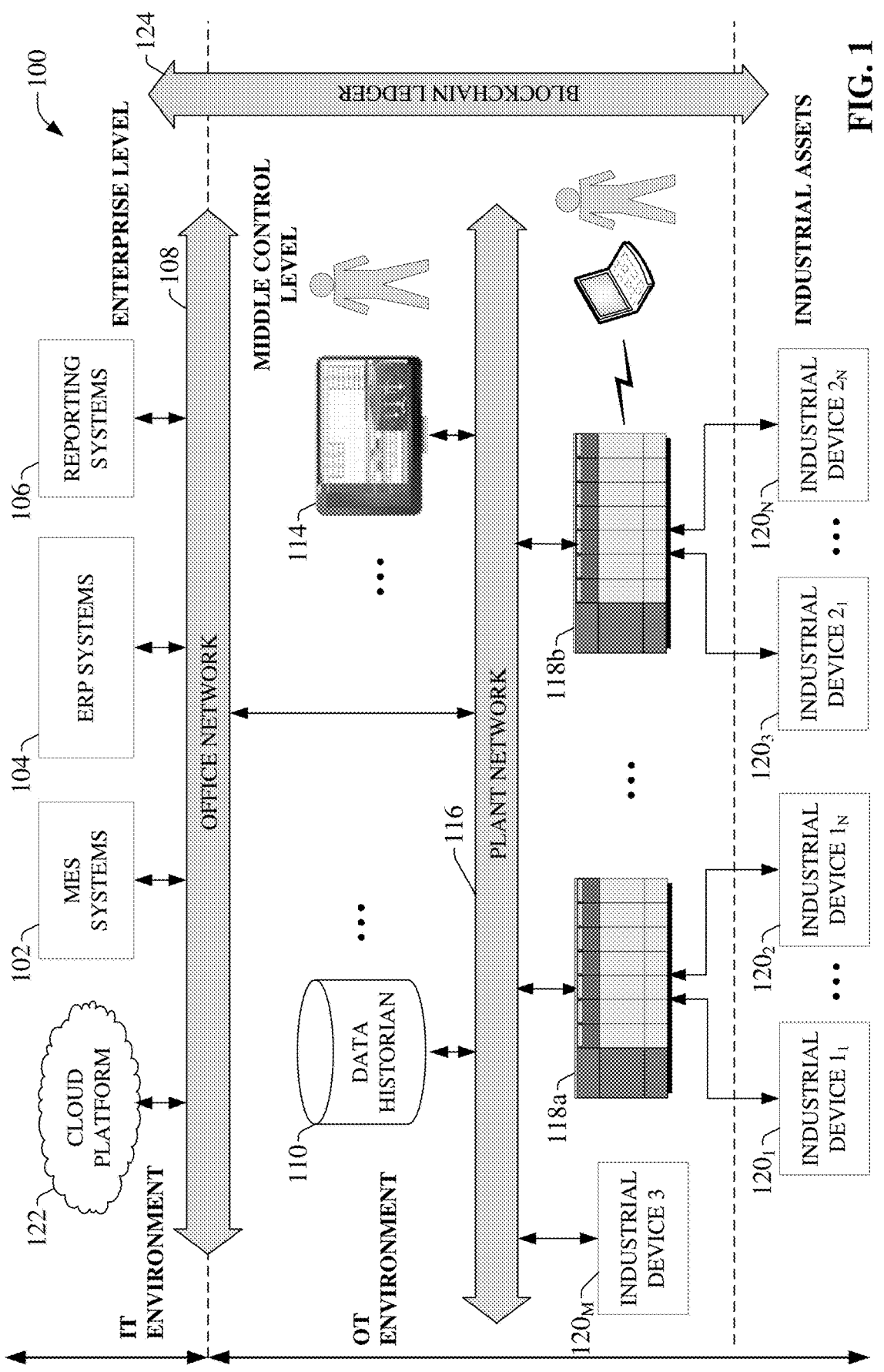
FIG. 1 is a block diagram of an example industrial control environment in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that can comprise a number of devices, components, modules, and the like. It is to be understood and appreciated that the various systems can comprise additional devices, components, modules, etc. and/or may not include all of the devices, components, modules etc. discussed in connection with the figures. A combination of these approaches also can be used.

FIG. 1 is a block diagram of an example industrial environment 100. In this example, a number of industrial controllers 118 (e.g., industrial automation devices, equipment, systems, etc.) can be deployed throughout an industrial plant environment (e.g., to monitor and control respective industrial systems or processes relating to product manufacture, machining, motion control, batch processing, material handling, or other suitable industrial functions). In various embodiments, industrial controllers 118 can execute respective control programs to facilitate monitoring and control of industrial devices 120 making up the controlled industrial assets or systems (e.g., industrial machines). One or more industrial controllers 118 can additionally or alternatively comprise a soft controller (e.g., executed on a personal computer, on a server blade, or other hardware platform, or on a cloud platform). Some hybrid devices can additionally or alternatively combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, structured text, C++, Python, JavaScript, etc.

In one or more embodiments, industrial devices 120 can comprise input devices that provide data relating to the controlled industrial systems to the industrial controllers 118, output devices that respond to control signals generated by the industrial controllers 118 to control aspects of the industrial systems, and/or devices that act as both input and output devices. Exemplary input devices can comprise telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and/or other suitable telemetry devices. Output devices can comprise motor drives, pneumatic actuators, signaling devices, robot control inputs, valves, and/or other suitable output devices. Some industrial devices, such as industrial device 120M, can operate autonomously on the plant network 116 (e.g., without being controlled by an industrial controller 118). It is noted that in some embodiments, an industrial device 120 can comprise an industrial controller 118 and/or an industrial automation robot.

In various implementations, industrial controllers 118 can communicatively interface with industrial devices 120 over hardwired connections or over wired or wireless networks. For example, industrial controllers 118 can be equipped with native hardwired inputs and outputs (e.g., that communicate with the industrial devices 120 to effect control of the devices). The native controller I/O can comprise digital I/O that transmits and receives discrete voltage signals to and from the field devices and/or analog I/O that transmits and receives analog voltage or current signals to and from the devices. The controller I/O can communicate with a controller's processor over a backplane (e.g., such that the digital and analog signals can be read into and controlled by the control programs). Industrial controllers 118 can additionally or alternatively communicate with industrial devices 120 over the plant network 116 using, for instance, a communication module or an integrated networking port. Exemplary networks can comprise the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can additionally or alternatively store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices (e.g., including but not limited to motor drives, instruments, or condition monitoring modules) can store data values that are used for control and/or to visualize states of operation. Such devices can additionally or alternatively capture time-series data or events on a log for later retrieval and viewing.

Industrial automation systems herein can comprise one or more human-machine interfaces (HMIs) 114 that can enable plant personnel to view telemetry and status data associated with the automation systems and/or to control some aspects of system operation. HMIs 114 can communicate with one or more of the industrial controllers 118 over a plant network 116, and/or exchange data with the industrial controllers to facilitate visualization of information relating to the controlled industrial processes on one or more pre-developed operator interface screens. HMIs 114 can additionally or alternatively be configured to enable operators to submit data to specified data tags or memory addresses of the industrial controllers 118, thereby providing a means for operators to issue commands to the controlled systems (e.g., cycle start commands, device actuation commands, etc.) to modify setpoint values, etc. HMIs 114 can generate one or more display screens through which the operator interacts with the industrial controllers 118, and thereby with the controlled processes and/or systems. Exemplary display screens of one or more embodiments herein can visualize present states of industrial systems or their associated devices using graphical representations of the processes that display metered or calculated values, employ color or position animations based on state, render alarm notifications, and/or employ other such techniques for presenting relevant data to the operator. Data presented in this manner can be read from industrial controllers 118 by HMIs 114 and presented on one or more of the display screens according to display formats chosen by the HMI developer. HMIs can comprise fixed location or mobile devices with either user-installed or pre-installed operating systems, and either user-installed or pre-installed graphical application software.

Some industrial environments can additionally or alternatively comprise other suitable systems or devices relating to specific aspects of the controlled industrial systems. For example, one or more data historians 110 can aggregate and/or store production information collected from the industrial controllers 118 and other industrial devices.

Industrial devices 120, industrial controllers 118, HMIs 114, associated controlled industrial assets, and/or other plant-floor systems such as data historians 110, vision systems, and/or other suitable systems can operate on the operational technology (OT) level of the industrial environment. Higher level analytic and reporting systems can operate at the higher enterprise level of the industrial environment in the information technology (IT) domain (e.g., on an office network 108 or on a cloud platform 122). Such higher-level systems can comprise, for instance, enterprise resource planning (ERP) systems 104 that can integrate and/or collectively manage high-level business operations, such as finance, sales, order management, marketing, human resources, and/or other such business functions. Manufacturing Execution Systems (MES) 102 can monitor and manage control operations on the control level given higher-level business considerations. Reporting systems 106 can collect operational data from industrial devices on the plant floor and generate daily and/or shift reports that summarize operational statistics of the controlled industrial assets. One or more components, devices, systems, etc. of the industrial environment 100 can be configured to utilize or interface with the blockchain ledger 124 (e.g., an immutable blockchain ledger).

Figure 2:
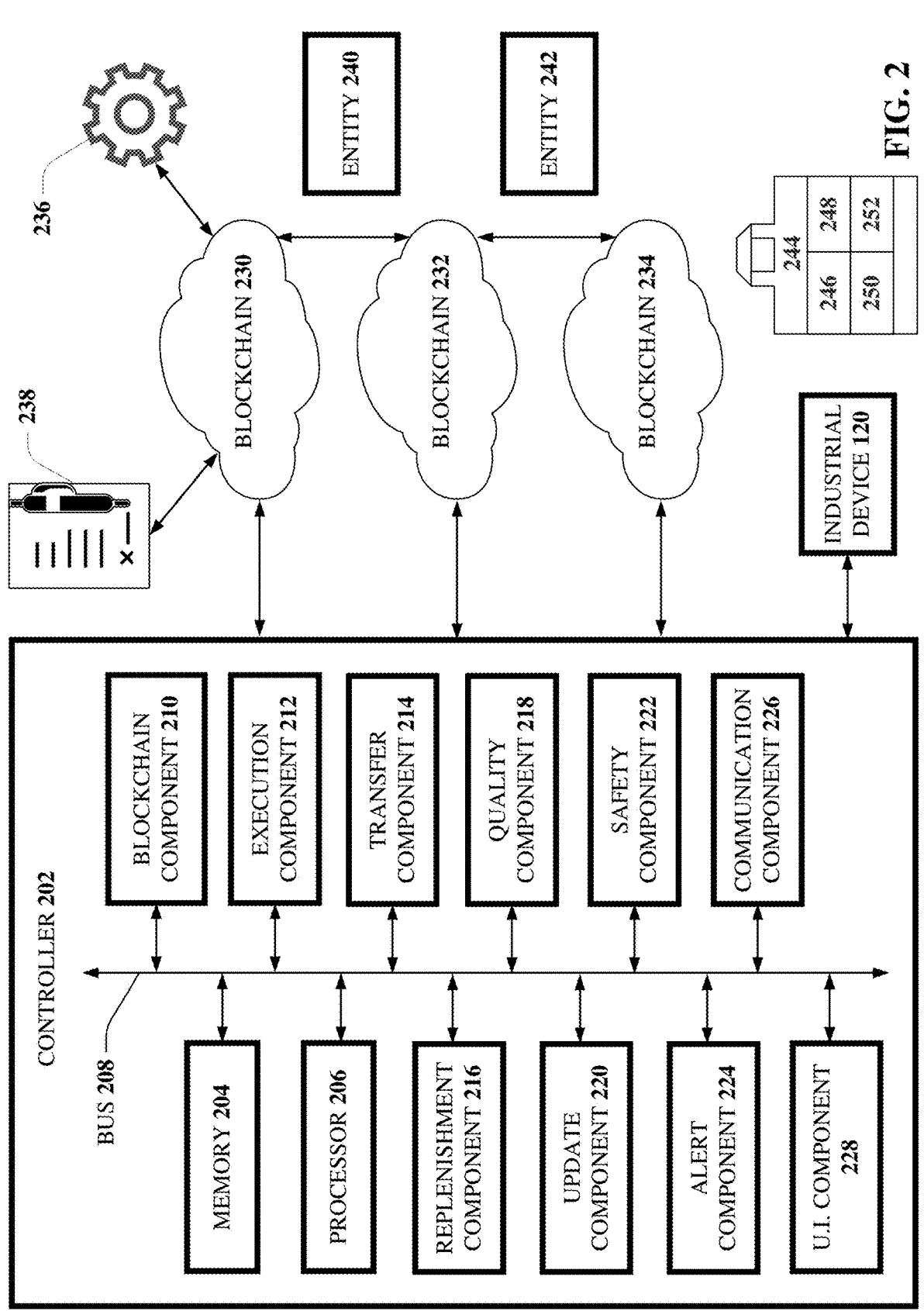
FIG. 2 is a block diagram of an exemplary controller in accordance with one or more embodiments described herein.

FIG. 2 illustrates an example, non-limiting blockchain enabled industrial automation controller 202 in accordance with one or more embodiments herein. Controller 202 can comprise a computerized tool, which can be configured to perform various operations relating to performance-based smart contracts in industrial automation. The controller 202 can comprise one or more of a variety of components, such as memory 204, processor 206, bus 208, blockchain component 210, execution component 212, transfer component 214, replenishment component 216, quality component 218, update component 220, safety component 222, alert component 224, communication component 226, and/or user interface (U.I.) component 228. In various embodiments, the controller 202 can be communicatively coupled to, or can further comprise, blockchain ledger 230, blockchain ledger 232, blockchain ledger 234, blockchain oracle 236, smart contract 238, and/or industrial device 120. In various embodiments, one or more of the memory 204, processor 206, bus 208, blockchain component 210, execution component 212, transfer component 214, replenishment component 216, quality component 218, update component 220, safety component 222, alert component 224, communication component 226, U.I. component 228, blockchain ledger 230, blockchain ledger 232, blockchain ledger 234, blockchain oracle 236, smart contract 238, and/or industrial device 120 can be communicatively or operably coupled (e.g., over a bus or wireless network) to one another to perform one or more functions of the controller 202. According to an embodiment, the controller 202 can comprise a programmable logic controller (PLC), programmable automation controller (PAC), or other such device.

A variety of industrial automation devices and controllers herein can be configured to support implementation of smart contracts. Smart contracts can utilize machine-to-machine communication (e.g., utilizing a blockchain network) to facilitate automatic actions in response to fulfillment of defined terms of the smart contract (e.g., for delivery of products to a vendor). If delivering parts to a vendor, payment can be subject to whether parts satisfy a quality metric (e.g., by testing the parts). In various embodiments, industrial automation equipment in a factory can execute smart contracts. For example, if a PLC is aware of the quantity products that have been produced and the corresponding components or raw materials used, the PLC can then look upstream for smart contracts (e.g., with component suppliers) to be fulfilled. In another example, smart contracts can initiate replenishment of inventory and thus be part of an ERP system, thereby reducing material shortages. In this regard, smart contacts can expedite payments of asset transfers. In an embodiment, industrial automation equipment can be provided to customers (e.g., at a reduced cost). Payment for the industrial automation equipment can be based on output of the industrial automation equipment (e.g., products provided using the industrial automation equipment) as tracked via a blockchain. In another embodiment, a manufacturer can manufacture a product on behalf of another entity and share in the revenue stream. In this regard, blockchain can be utilized to track the sales of products and execute smart contracts to automatically process payments and facilitate revenue sharing.

In various embodiments, the controller 202 can be configured to facilitate execution of various elements of a smart contract (e.g., smart contract 238). The smart contract 238 can be stored one a blockchain ledger herein, and can comprise a blockchain-based program that is configured to automatously execute, control, or document defined events or actions according to one or more terms of the smart contract 238. In various embodiments, a plurality of smart contracts 238 can be stored on one or more blockchains herein. In some instances, the plurality of smart contracts can be interdependent, or one smart contract can depend on another smart contract. In this regard, the blockchain component 210 can store data representative of an output of an industrial automation device (e.g., industrial device 120) to an industrial blockchain (e.g., blockchain 230). Such data representative of an output of an industrial automation device can comprise a quantity of products produced, quantity of components used, measure of raw materials used, time spent in production, energy consumed for production, or other suitable data. It is noted that a blockchain network herein can comprise a plurality of industrial blockchains, such as industrial blockchain 230, industrial blockchain 232, and/or industrial blockchain 234, among other industrial blockchains. In various embodiments, blockchains herein can comprise a database distributed across a network of devices or nodes in a network, and can be accessible via a plant network (e.g., plant network 116) or office network (e.g., office network 108), or directly via communicatively coupled devices, systems, components, etc. To write to the blockchain 230 (e.g., by a controller, system, and/or component herein), a request can be broadcast by the blockchain component 210 to some or all registered participants of the blockchain ledger 230. These participants can include other controllers, devices, systems, or nodes that are authorized to participate in the blockchain ecosystem. Every registered participant can check hashes against defined blockchain algorithms in order to validate the request to write to the blockchain 230. Using a defined proof of work algorithm, participants of the blockchain ledger 230 can determine validity of the new block(s). Validity of the new block(s) can be determined based upon the participants reaching a consensus or a defined threshold for agreement (e.g., according to a defined agreement criterion) for determining validity. If consensus or a defined agreement is reached, the new block(s) can be added to the blockchain ledger 230. In some embodiments, the immutable blockchain ledger 230 can be associated exclusively with the controller 202, thus yielding a 1:1 relationship between blockchain ledgers and controllers (and/or systems herein) in which each blockchain ledger is associated with only one controller or system. In other embodiments, a single immutable blockchain ledger 230 can be associated with a plurality of controllers and/or systems described herein. In some embodiments, rather than storing entire datasets to the blockchain 230, fingerprints representative of such datasets can be stored to the blockchain 230. In various embodiments, such fingerprints can be generated using a defined hash or checksum algorithm. It is noted that the blockchain ledger 230 can capture sequence(s) of operations. In this regard, operations A,B,C can yield different results as compared to the same operations in order C,A,B. The foregoing principle can be utilized, for instance, by a system herein, to calibrate industrial automation equipment before generating products using the industrial automation equipment, thus enforcing that operations applied to a device were actually applied (e.g., upgraded, installed, etc.) in a correct order. In the event of a failure to validate a block chain query/request a system herein can return message (e.g., via a user interface of a system or controller herein) indicating the reason(s) that the failure occurred (e.g., cannot use feature X because user did not pay yearly membership fee and did not upgrade equipment to the latest revision of software).

In various embodiments, the execution component 212 can, in response to output of an industrial device 120 satisfying a smart contract 238 (e.g., satisfying a term of the smart contract 238) that is stored on the industrial blockchain 230, facilitate execution of an element of the smart contract 238. Such an element can comprise facilitation of a payment associated with the product output (e.g., according to a term of a smart contract or as otherwise defined), generation of an order comprising a raw material applicable to a product produced by the industrial automation equipment (e.g., restocking on raw materials), generating a message comprising message data indicative of the product output and sending the message to a registered participant of the smart contract 238 (e.g., via the communication component 226 and/or U.I. component 228), or another suitable action. It is noted that the blockchain component 210 and/or execution component 212 can determine whether such output of the industrial device 120 satisfies the smart contract 238.

In one or more embodiments, industrial automation device (e.g., industrial device 120) can be one of a group of industrial automation devices (see, e.g., FIG. 1). In this regard, the above-described output can comprise an aggregated output of the group of industrial automation devices (e.g., 120₁-120_N), and the execution component 212 can facilitate execution of the element of the smart contract 238 in response to the aggregated output satisfying the smart contract 238. In this regard, the group of industrial automation devices (e.g., 120₁-120_N) can comprise a first industrial device 120₁ and a second industrial device 120₂. In various implementations, the first industrial device 120₁ and second industrial device 120₂ can produce a common product (e.g., product 244) represented in the aggregated output. It is noted that the product 244 can comprise a finished product or component manufactured using industrial automation equipment controlled via the controller 202.

In an example, execution (e.g., via the execution component 212) of an element of the smart contract can comprise initiating a shipment of one or more products 244 represented in output of the industrial device(s) 120. The execution component 212 can, for instance, purchase postage or a shipping label, determine appropriate packaging, generate a request for a shipment pickup, or another suitable action associated with the shipment of products herein. In another example, an element of the smart contract can comprise transfer of electronic funds (e.g., a cryptocurrency and/or electronic dollars). In this regard, the transfer component 214 can based on the output of the industrial automation device(s), transfer the electronic funds from a one entity (e.g., entity 240) (e.g., a user entity of the industrial automation device) to another entity (e.g., entity 242) (e.g., an owner entity) of the industrial automation device. In another example, the transfer component 214 can, based on the output of the industrial automation device(s), transfer the electronic funds from a one entity (e.g., entity 240) (e.g., a user entity of the industrial automation device) to another entity (e.g., entity 242) (e.g., a license holder entity of the product 244 represented in the output of the industrial automation device(s)). In yet another example, an element of the smart contract 238 can comprise replenishment of one or more raw materials applicable to the product 244. In this regard, the replenishment component 216 can, based on a volume of the output, generate an order comprising a raw material applicable to output of the industrial device(s) 120. It is noted that the product 244 can comprise one or more of a variety of raw materials and/or components. For example, the product 244 can comprise raw material 246, raw material 248, component 250, component 252, etc. These raw materials and/or components can be the pieces that industrial automation equipment herein use to build or assembly the product 244.

According to an embodiment, the quality component 218 can determine whether output of the industrial device(s) 120 satisfies a defined quality criterion defined in the smart contract 238. Such a defined quality criterion can comprise one or more of a rating, failure rate, time between failure, defect rate, yield, scrap rate, factory acceptance test, or another suitable quality criterion. In this regard, the execution component 212 can facilitate execution of an element of the smart contract 238 further in response to the output of the industrial device(s) 120 satisfying the defined quality criterion.

In another embodiment, smart contracts can be utilized in billing customers for updates of industrial automation equipment or devices herein. In this regard, a smart contract can automatically transfer payment for an update upon a PLC confirming successful installation of the update. According to an embodiment, the update component 220 can, in response to receiving an update request (e.g., via the communication component 226) from a user industrial device (e.g., industrial device 120), install an update (e.g., a firmware update, a configuration update, or another suitable update) to the user industrial device. The update can be transmitted by the update component 220 via a blockchain herein and/or a network, such as cloud platform 122, office network 108, or plant network 116. In various embodiments, the transfer component 214 can, in response to the installation of the update to the user industrial device being determined (e.g., via the update component 220 and/or transfer component 214) to satisfy a defined term of a smart contract, retrieve an electronic payment for the update (e.g., an electronic payment accessible via the smart contract). It is noted that in various embodiments, the communication component 226 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.) In industrial settings, some industrial automation equipment must be safety certified. For example, certification can be contingent upon routine inspections. In some cases, third party equipment must also be certified. In this regard, smart contracts can be utilized to enforce such safety certifications. For example, a blockchain can be utilized to capture completion of safety inspections and associated details, including inspection person and pictures associated with the inspection. Further, safety events or other problems can be captured on the blockchain. For example, an irrefutable history of lockout-tagout of a machine can be recorded. Safety compliance of equipment can be a condition in a smart contract, in which industrial automation equipment can be automatically prevented from operating or permitting payments if safety compliance is not maintained. According to an embodiment, the safety component 222 can determine whether a defined safety certification applicable to an industrial automation device (e.g., industrial device 120) and defined in a smart contract (e.g., smart contract 238) stored on an industrial blockchain (e.g., industrial blockchain 230) is satisfied by the industrial automation device. The execution component 212 can, in response to the defined safety certification being determined not to be satisfied, disable a feature of the industrial automation device (e.g., industrial device 120). In various embodiments, the defined safety certification can be based on a completion of a defined inspection of the industrial automation device. In other embodiments, the defined safety certification is based on a lockout tagout event associated with the industrial automation device.

According to an embodiment, the alert component 224 can generate an alert comprising a recommendation to complete the defined safety certification. For example, the alert component 224 can generate a notification that can be rendered on a client device in order to alert a user of the failure to satisfy the defined safety criterion and/or a recommendation to complete the defined safety criterion. In further embodiments, the execution component 212 can, in response to the defined safety certification being determined to be satisfied, enable a feature of the industrial automation device (e.g., a feature that was previously disabled by the execution component 212).

To this and various other ends, it is noted that the supply, manufacturing, and distribution chain for a manufactured product extends well beyond the boundaries of a single industrial facility, and crosses boundaries between several interconnected but substantially independent entities. For example, an industrial enterprise (which may comprise one or more manufacturing and warehouse facilities under a common ownership) may receive materials or component parts from one or more supplier entities that produce the materials or parts. The enterprise may also purchase industrial assets (e.g., custom-built machines, motor control cabinets, etc.) from one or more original equipment manufacturers (OEMs). Manufactured products are sold and distributed via retail outlets that may be owned and operated by entities who are independent from the industrial enterprise. While these independent entities may collect and track data generated within their own boundaries as participants in a common supply chain, these various entities may benefit from selective sharing of their collected data. Reliable and trusted sharing of data can be particularly crucial if business contracts between the entities are in place, since this shared information can ensure that the terms of the contracts are being satisfied. However, since each entity's data is typically collected and stored locally (or on protected remote storage, such as a proprietary cloud-based storage platform), shared data owned by one of the entities may not be easily and readily accessible by third parties, and trustworthiness of the shared data may be a concern.

During operation at the manufacturing entity's facility, the blockchain-enabled industrial controller 202 can track a number of production statistics, including an accumulated number of operating cycles performed by the machine, an accumulated amount of time that the machine has run, a number of parts produced by the machine, etc. The controller 202 and/or industrial devices of a machine's control cabinet can record this production data in the blockchain ledger 230, 232, and/or 234. The control devices also record modifications made to the machine or its associated industrial devices by the manufacturing entity. For example, changes made to the firmware of the industrial controller or other control devices as a result of reimaging or patching are recorded in the public blockchain ledger, as are modifications made to the OEM-developed control program or application executed on the industrial controller.

In response to determining that information stored in the public ledger satisfies a criterion (e.g., a criterion defined in a smart contract) indicating that the OEM is contractually obliged to perform a component replacement or other maintenance action on the machine (e.g., in response to execution of a defined number of machine cycles, when the accumulated machine run time exceeds a defined number of operating hours, when the machine has produced a defined number of parts, etc.), the blockchain component 212 can sign, on behalf of the owner, a verifiable and contractually binding component replacement order as a transaction in the blockchain 230, 232, and/or 234.

Since the OEM has access to data stored in the public blockchain, the OEM receives and verifies the component replacement order, and in response ships the necessary machine component to the manufacturing entity. The manufacturing entity installs the replacement component and records a signed conformation of the replacement in the public blockchain ledger. The OEM can use this verified transaction to initiate payment processing. Using this system, the replacement component, the vendor-specific device firmware, and the OEM-specific application are all verifiably tracked in the blockchain ledger 230, 232, and/or 234.

The current state reflected in the public blockchain can reflect the authorized production cycle count, which can be viewable by both the OEM and the end user. For subscription-based operation of the machine, the OEM can authorize the production cycle count in the public blockchain ledger based on payment and agreement. The end-user can also set the criteria for the machine to automatically renew additional production authorization at defined thresholds.

Figure 3:
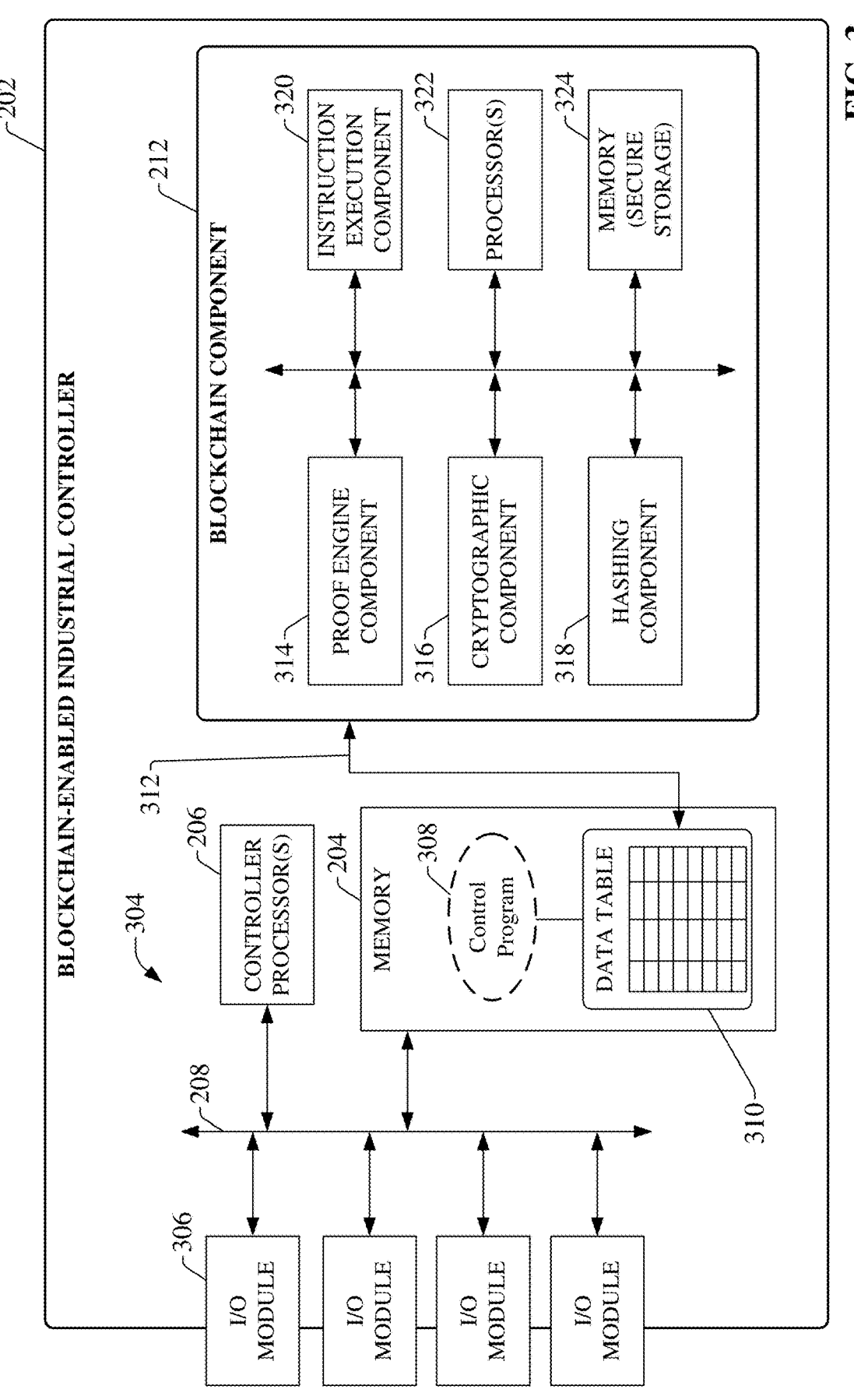
FIG. 3 is a block diagram of an exemplary controller in accordance with one or more embodiments described herein.

FIG. 3 is another diagram of the example blockchain-enabled industrial controller 202, illustrating that hardware and processing resources for carrying out industrial blockchain functions can be segregated from processing resources that carry out the controller's primary control functionality. In this example architecture, control components 304 can include the memory 204 on which is stored the control program 308 executed by the controller 202 and the data table 310 that stores real-time values of the controller's digital and analog inputs and outputs, setpoint values, calculated values, or other data tag values. Control components 304 also include one or more I/O modules 306, which interface the controller 202 with input and output devices (not shown), such an industrial automation equipment, that make up a controlled industrial system or process. I/O modules 306 are communicatively connected to the controller's backplane or communication bus 208, and exchange data with the data table 310 via the backplane. I/O modules 306 can include input modules that measure aspects of the controlled system as digital and/or analog signals (e.g., 4-20 mA signals, 0-10 VDC signals, switched input voltages, etc.) and write these values to designated data tags or memory addresses of data table 310. I/O modules 306 can also include output modules that read digital or analog values from designated data tags or memory addresses of data table 310 and translate these values into output signals (e.g., switched outputs, 4-20 mA output signals, 0-10 VDC output signals, etc.) directed to output devices of the controlled system. One or more controller processors 206 or execution engines execute the control program 308 and control updating of data values in the data table 310 in accordance with measured data from the I/O modules 306 and execution of the control program 308.

In this illustrated example, the blockchain component 212 is embodied as a sub-system of controller 202, and is implemented using separate memory and processing resources from control components 304. For example, blockchain component 212 can utilize its own processor 322 and memory 324, which are separate from controller processor(s) 206 and memory 204. In this way, blockchain functions (e.g., transaction processing and validation, block generation, smart contract processing and enforcement, etc.) performed by the blockchain component 212 can be segregated from control-related analytics, and is not necessarily implemented using the primary control language of the controller 202. While components of the blockchain component 212 can read data from and write data to the controller's data table 310 (e.g., via a data bus 312) in connection with performing blockchain creation and management functions, the processing resources used to carry out these blockchain functions are physically separated from those used to carry out control. In this way, blockchain functions carried out by the blockchain component 212 do not impact performance of the controller's basic control functionality. As noted above, although FIG. 3 depicts the embedded blockchain component 212 as being a sub-system of an industrial controller, blockchain component 212 can also be embedded on other types of industrial devices, including but not limited to motor drives, industrial sensors, vision systems, safety relays, barcode stampers, or other such devices.

The blockchain component 212 can be utilized in virtually any type of data-generating industrial device, including but not limited to an industrial controller 202, a motor drive, an HMI terminal, a vision system, an industrial optical scanner, a meter, a telemetry device, an industrial safety device, a safety relay, a barcode stamper, an ERP server, an MES server, an industrial Internet of Things (IIoT) device, or other such device or system. The blockchain component 212 can comprise a proof engine component 314, a cryptographic component 316, a hashing component 318, an instruction execution component 320, one or more processors 322, and/or memory 324. In various embodiments, one or more of the proof engine component 314, cryptographic component 316, hashing component 318, instruction execution component 320, the one or more processors 322, and/or memory 324 can be electrically and/or communicatively coupled to one another to perform one or more of the functions of the blockchain component 212. In some embodiments, components 314, 316, 318, and/or 320, can comprise software instructions stored on memory 324 and executed by processor(s) 322.

Proof engine component 314 can be configured to validate industrial or supply chain transactions for inclusion in a new block of an industrial blockchain in accordance with a blockchain instruction. Cryptographic component 316 can be configured to encrypt and decrypt transaction data, recipe data, or other information exchanged with other blockchain-enabled industrial devices within a blockchain system or ecosystem. In some embodiments, cryptographic component 316 can leverage private keys and/or public keys in connection with encryption and decryption of blockchain information. Hashing component 318 can be configured to hash transaction data and generate Merkle trees in accordance with a blockchain instruction. Instruction execution component 320 can be configured to execute industrial blockchain instructions that create blocks representing transactions received or executed by the blockchain component 212, add the blocks to industrial blockchains, and/or update a blockchain ledger.

The one or more processors 322 can perform one or more of the functions described herein with reference to the systems and/or methods disclosed. Memory 324 can be a computer-readable storage medium storing computer-executable instructions and/or information for performing the functions described herein with reference to the systems and/or methods disclosed. As will be described in more detail below, processor(s) 322 and memory 324 may be segregated from the primary memory that performs the device's real-time control functions. It is noted that memory herein can be removable (e.g., a removable memory card, USB drive, etc.) For example, an industrial network may not comprise an open network for which a system herein can query a cloud network or server directly. Thus, such networks can comprise intranet networks exposed only to a plant floor, thus preventing exposure of the networks to the internet and reducing risks of ransomware or secure hacks. Removable memory devices can thus be utilized in controllers herein to read/write data for a token herein and/or smart contract query of an industrial blockchain.

Figure 4:
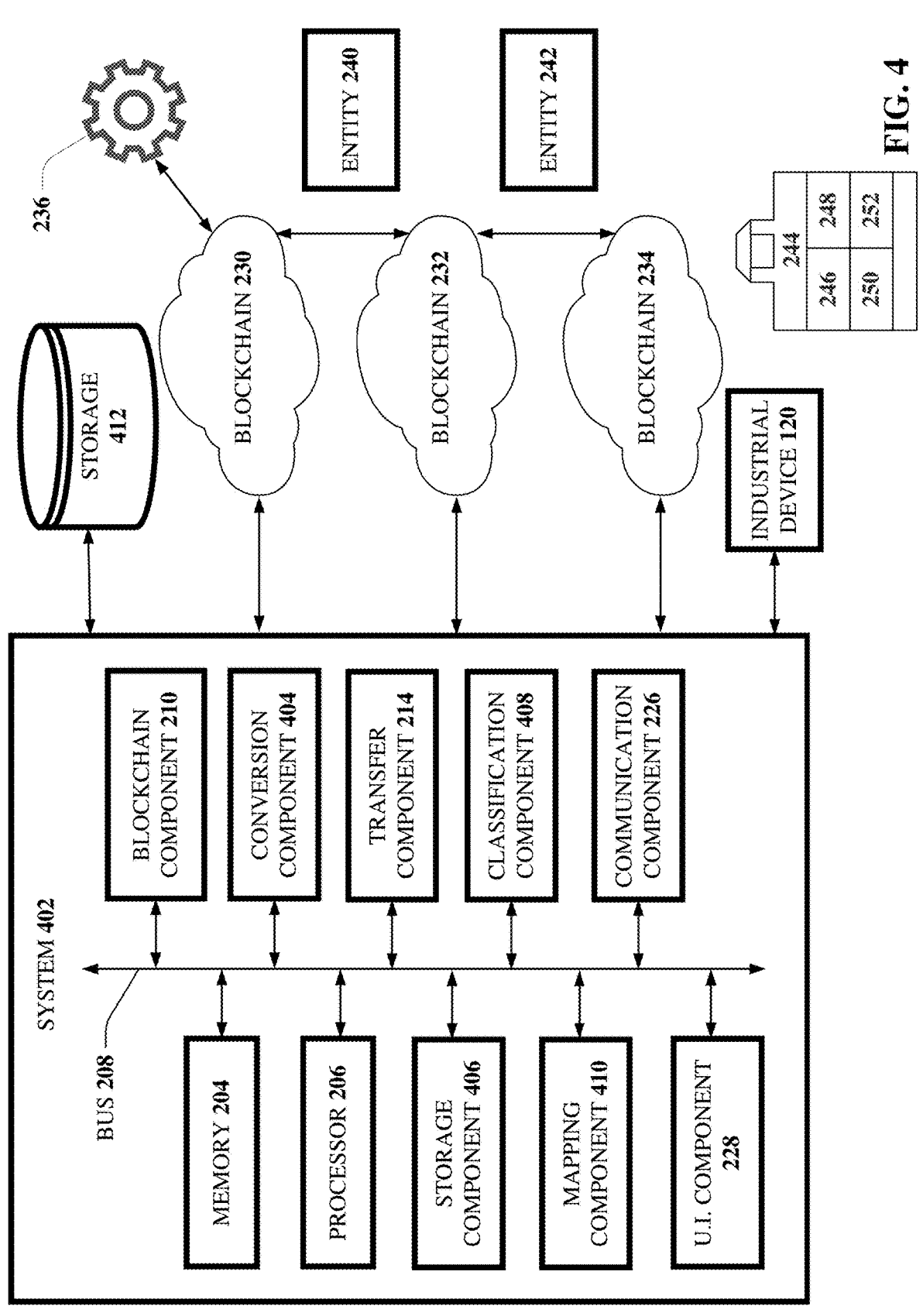
FIG. 4 is a block diagram of an exemplary system in accordance with one or more embodiments described herein.

FIG. 4 illustrates an example, non-limiting blockchain enabled system 402 in accordance with one or more embodiments herein. System 402 can comprise a computerized tool, which can be configured to perform various operations relating to industrial automation blockchain data management. The system 402 can comprise one or more of a variety of components, such as memory 204, processor 206, bus 208, blockchain component 210, transfer component 214, communication component 226, U.I. component 228, conversion component 404, storage component 406, classification component 408, and/or mapping component 410. In various embodiments, the system 402 can be communicatively coupled to, or can further comprise, blockchain ledger 230, blockchain ledger 232, blockchain ledger 234, blockchain oracle 236, industrial device 120, and/or storage 412. In various embodiments, one or more of the memory 204, processor 206, bus 208, blockchain component 210, transfer component 214, communication component 226, U.I. component 228, conversion component 404, storage component 406, classification component 408, mapping component 410 blockchain ledger 230, blockchain ledger 232, blockchain ledger 234, blockchain oracle 236, industrial device 120, and/or storage 412 can be communicatively or operably coupled (e.g., over a bus or wireless network) to one another to perform one or more functions of the system 402.

In various embodiments, it can be desirable to move or convert data stored on one blockchain to another blockchain. For example, one blockchain may be public or private, and another blockchain may be the opposite or utilize a different type of blockchain. According to an embodiment, the transfer component 214 can, using a defined conversion algorithm, convert first data from a first industrial blockchain (e.g., blockchain 230) to second data applicable to a second industrial blockchain (e.g., blockchain 232), other than the first industrial blockchain. The defined conversion algorithm can be configured to convert the first data to the second data, from one of a variety of types of blockchains to a variety of other types of blockchains. It is noted that such a conversion can comprise copying a hash from one blockchain to another (e.g., a hash from a first blockchain to a second blockchain), copying a data element or data elements from one blockchain to another (e.g., data elements of a first blockchain to a second blockchain), converting the data itself (e.g., from a first blockchain to a second blockchain), or another suitable conversion (e.g., using the defined conversion algorithm). The blockchain component 210 can then write the second data to the second industrial blockchain (e.g., blockchain 232). In an embodiment, the first industrial blockchain can comprise a private blockchain and the second industrial blockchain can comprise a public blockchain. Alternatively, the first industrial blockchain can comprise a public blockchain and the second industrial blockchain can comprise a private blockchain. In other embodiments, first industrial blockchain and the second industrial blockchain can both comprise private blockchains, or first industrial blockchain and the second industrial blockchain can both comprise private blockchains. In one or more embodiments, the U.I. component 228 can render an output indicative of the writing of the second data to the second industrial blockchain. For example, the U.I. component 228 can generate a notification that can be rendered on a client device in order to alert a user that the conversion has been completed. The U.I. component 228 can render an output via a client device (not depicted) or another suitable output medium. It is noted that the U.I. component 228 can render an output visually (e.g., on screen/display) or audibly and/or communicated to one or more external devices via the communication component 226. According to an embodiment, the U.I. component 228 can perform visualization functions similar to those of HMI 114, including rendering telemetry and/or status data associated with the system 402 and other systems, controllers, or components herein. Further, the communication component 226 can send or receive data associated with the system 402 or other systems, controllers, or components herein. For example, the communication component 226 can facilitate communication between the system 402, controller 202, office network 108, plant network 116, blockchain ledger 124, and/or corresponding devices, systems, components, platforms, etc. In various embodiments, the U.I. component 228 can be configured to receive user input and to render output to the user in any suitable format (e.g., visual, audio, tactile, etc.). In some embodiments, U.I. component 228 can be configured to communicatively interface with a development application that executes on a client device (e.g., a laptop computer, tablet computer, smart phone, etc.) that is communicatively connected to the blockchain-enabled industrial device (e.g., via a hardwired or wireless connection). The U.I. component 228 can then receive user input data and render output data via the development application. In other embodiments, U.I. component 228 can be configured to generate and serve suitable graphical interface screens to a client device, and exchange data via these graphical interface screens. Input data that can be received via U.I. component 55/can include, but is not limited to, user-defined control programs or routines that include industrial blockchain instructions, blockchain configuration parameters (which may be provided as configuration parameters of the blockchain instructions), or other such data.

In an embodiment, the second industrial blockchain can be associated with a product (e.g., product 244) generated using an industrial automation device (e.g., industrial device 120), and the first industrial blockchain can be associated with a component (e.g., component 250 and/or component 252) of the product 244. In one or more embodiments, the first industrial blockchain can comprise a first blockchain technology type, and the second industrial blockchain can comprise a second technology type, other than the first blockchain technology type. Such blockchain technology types can comprise public blockchains, private blockchains, hybrid blockchains, consortium blockchains, and/or other suitable types of blockchains.

In another embodiment, the conversion component 404 can convert (e.g., using a defined conversion algorithm) first data from an industrial blockchain to second data. In this regard, such first data can be associated with a product (e.g., product 244) manufactured using industrial automation equipment (e.g., industrial device 120). The storage component 406 can store such second data in a non-blockchain data storage (e.g., storage 412). In other embodiments, the storage component 406 can store such second data in a blockchain oracle 236 registered with the industrial system 402. In additional embodiments, the storage component 406 can provide such second data to a historian device (e.g., data historian 110) of a manufacturing entity associated with the product 244. In some embodiments, the storage 412 can comprise comprises a server associated with a supplier entity associated with the product 244. In further embodiments, the storage 412 can comprise a data storage of a manufacturing entity associated with the product 244. In various embodiments, the U.I. component 228 can render an output indicative of the writing of the second data to the non-blockchain data storage (e.g., storage 412). In one or more embodiments, the transfer component 214 can transfer the above-described first data from a first industrial blockchain (e.g., blockchain 230) to a second industrial blockchain (e.g., blockchain 232 or blockchain 234) based on the conversion by the conversion component 404.

According to another embodiment, the classification component 408 can, in response to receiving (e.g., via the communication component 226) a blockchain query request, determine a data classification applicable to the blockchain query request. Such a request can comprise a request to retrieve or access data from an industrial blockchain herein. In order to expedite such a retrieval, the mapping component 410 can map data stored on the industrial blockchain according to one or more of a group of data classifications (e.g., of a product generated using the industrial device 120). It is noted that data classifications herein can comprise one or more of device type, quality statistics, component source, or other suitable data classifications. In various embodiments, the blockchain component 210 can, based on the blockchain query request, query an industrial blockchain applicable to the data classification. In one or more embodiments, the U.I. component 228 can render an output representative of a result of the querying of the industrial blockchain. For example, the U.I. component 228 can generate a notification that can be rendered on a client device in order to alert a user of the results of the querying of the industrial blockchain. In further embodiments, the communication component 226 can send the output representative of a result of the querying of the industrial blockchain to a requesting entity that generated the blockchain query request (e.g., a customer entity, manufacturing entity, supplier entity, warehouse entity, retail entity, etc.), such as an entity depicted in FIG. 6.

Figure 5:
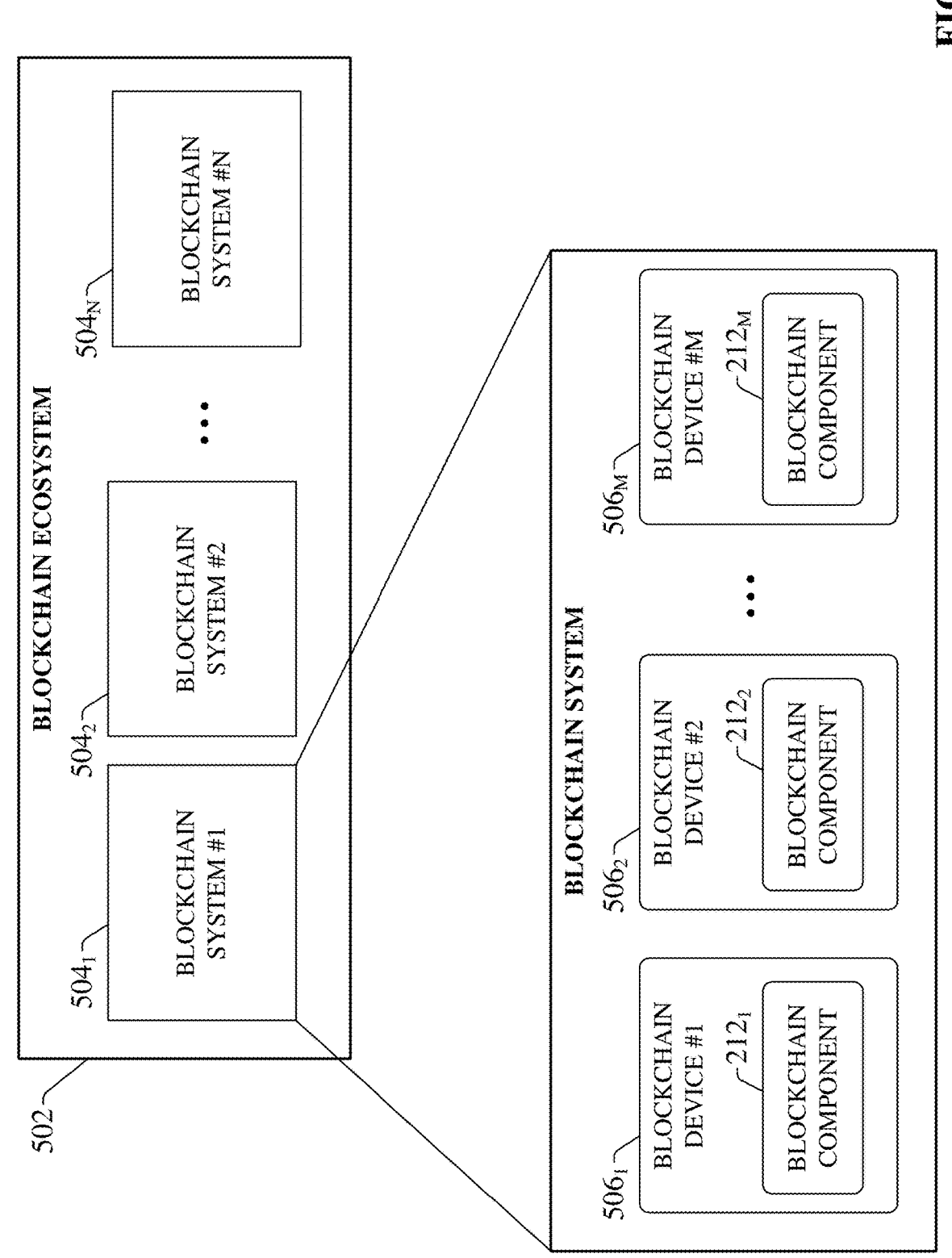
FIG. 5 is a diagram of an example industrial blockchain network architecture in accordance with one or more embodiments described herein.

FIG. 5 is a diagram of an example industrial blockchain network architecture. In this example implementation, an industrial blockchain ecosystem 502 can comprise multiple participating blockchain systems 504. One or more of the participating blockchain systems 504 can be industrial systems comprising multiple blockchain-enabled industrial devices 506 (e.g., blockchain-enabled controllers, HMI terminals, gateway devices, MES systems, motor drives, meters or other telemetry devices, sensors, ERP systems, data historians IIoT devices, etc.). The industrial blockchain ecosystem 502 can span multiple geographic, organizational, and business boundaries. The blockchain systems 504 can be owned by, or may represent, entities representing different disciplines within the manufacturing, supply, distribution, and/or retail chain, including but not limited to engineering and product development, product manufacturing, product testing, shipping, technical support, business and accounting, etc. Systems 504 may be associated with producers and manufacturers, suppliers, sub-system suppliers (e.g., OEMs), designers and engineers, retailers, shippers, customers, end consumers, or other such entities.

In some embodiments, blockchain-enabled industrial devices herein can be added to this infrastructure in a substantially plug-and-play manner. For example, upon power-up, a blockchain-enabled industrial device can broadcast its identity as a blockchain-enabled device to other devices on the blockchain network, and can also detect other blockchain-enabled devices. Devices across all layers of a plant (control, middleware, enterprise, etc.) can share their identities, born-on certificates, firmware versions, and other such information with other peer devices on the blockchain system 504 (and by extension the larger blockchain ecosystem 502). These devices can be preconfigured to cooperate with other blockchain-enabled industrial devices as a consortium within the blockchain system 504 to authenticate transactions using consensus mechanisms (e.g., practical byzantine fault tolerance, proof-of-work, proof-of-state, etc.)

Since manufacturing and distribution chains can comprise multiple different entities having complex business interrelationships, each entity may wish to regulate access to the information shared with other entities within the chain. For example, a supplier entity that manufactures and provides parts used by another manufacturing entity for manufacture of its own products may wish to provide only a limited subset of its available blockchain data relating to manufacture of the part (e.g., results of quality tests, manufacturing time stamps, a source of materials used to manufacture the part, etc.), while withholding other proprietary manufacturing statistics generated during production of the part and recorded in a blockchain. Accordingly, blockchain-enabled industrial devices herein can be configured to generate multiple versions of a blockchain with different degrees of access permissions.

Figure 6:
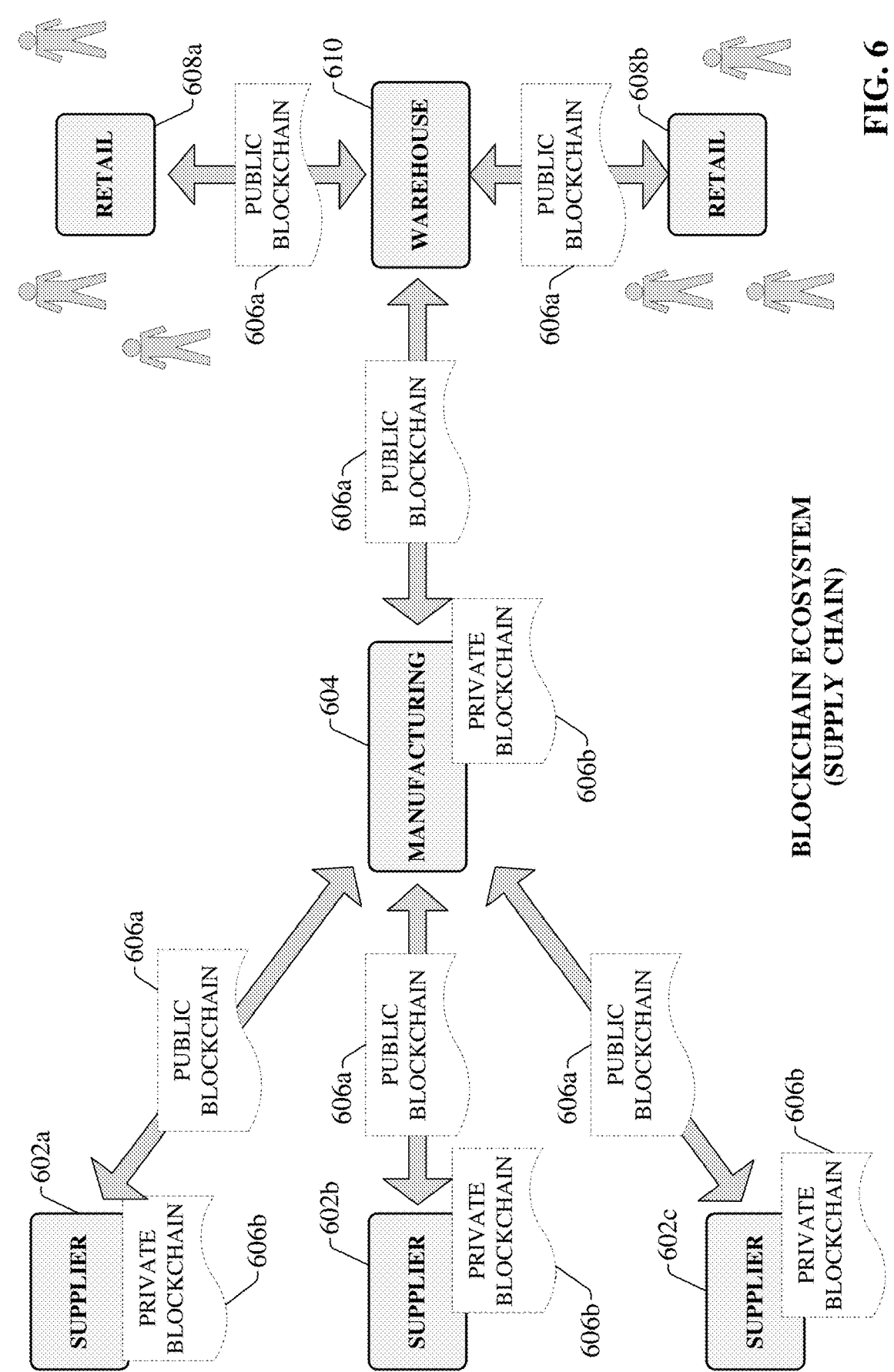
FIG. 6 is a diagram illustrating segregation of private and public blockchain information in an example industrial blockchain ecosystem in accordance with one or more embodiments described herein.

FIG. 6 is a diagram illustrating segregation of private and public blockchain information in an example industrial blockchain ecosystem. The example ecosystem depicted in FIG. 6 comprises a number of blockchain systems associated with respective entities that participate in a manufacturing and distribution chain, including supplier entities 602, a manufacturing entity 604, a warehouse entity 610, and retail entities 608. Supplier entities 602 may be manufacturing entities that provide parts or materials to manufacturing entity 604 that manufactures a product using the provided parts or materials. One or more supplier entities 602 may be OEMs that provide custom-built machines to the manufacturing entity 604. Manufacturing entity 604 may provide finished products to a warehouse 610, which may be owned by the same industrial enterprise that owns the manufacturing entity 604. Warehouse 610 may distribute product to retail entities 608. It is to be appreciated that the example industrial ecosystem depicted in FIG. 6 is only intended to be exemplary, and that an industrial blockchain ecosystem can comprise any collection of entities of various roles.

One or more of the blockchain systems that make up the ecosystem can maintain both private blockchains 606b for internal use as well as public blockchains 606a accessible to other participating entities in the blockchain ecosystem. Public and private industrial blockchains can be used within a blockchain ecosystem comprising several business entities of a supply chain for a variety of applications, including but not limited to tracking of machine performance and usage, tracking of products across a manufacturing facility or within a single industrial enterprise, tracking of products across the larger supply and distribution chain, distribution of proprietary recipe information, and product auditing. These example industrial blockchain applications are discussed in more detail below. It is noted that while FIG. 6 depicts only public and private blockchains, other blockchain types or technology types can be utilized, such as hybrid blockchains, consortium blockchains, and/or other suitable types of blockchains.

Blockchain-enabled industrial devices that support generation of public and private industrial blockchains, as well as other blockchain types, can be used to track performance and usage of machines sold by OEMs to their customer manufacturing entities. In an example scenario, multiple machines built by different OEMs (e.g., one or more supplier entities 602) can be deployed to an end user manufacturing site (manufacturing entity 604). According to a vertical-specific example, manufacturing entity 604 may be a beverage factory that runs a bottling line comprising fillers, sealers, conveyors, cartoners, and other machines. Some of the machines that make up the bottling line may be built and provided by one or more OEMs. During the machine build, blockchain-enabled industrial devices herein at the OEMs can generate private blockchains 606b that record transactions and associated data associated with the machine building process that are to be accessible only by authorized devices and personnel associated with the OEM. The OEM's blockchain-enabled industrial devices can also be configured to generate public blockchains 606a that record publicly shared transaction data that can be accessed and viewed by other devices that participate in the blockchain ecosystem, including devices associated with the customer manufacturing entity 604. This publicly accessible information can include, for example, results of factory acceptance tests (FATs) performed on the machine prior to shipping to the customer. Blockchain-enabled industrial devices that make up the machine, as well as blockchain-enabled test equipment used by the OEM, can capture these FAT results as transactions and record the results as validated blocks in the machine's public blockchain, which is shared with blockchain node devices at the manufacturing facility.

Additionally, blockchain-enabled devices within the plant can generate a public version of the machine's blockchain that includes warranty-related information that is accessible by outside support entities (e.g., OEMs or other technical support entities) who have a business interest in the information. Information in this public version of the blockchain can include, for example, operating hours, power cycles, identities of devices added to the machine (which may be unauthorized devices), etc. This public version of the machine's blockchain can be viewed by outside support entities to validate claims made by the machine owner regarding internal maintenance actions performed on the machine or the machine's operational history.

The techniques described above regarding the use of industrial blockchains to track an OEM-provided machine or a product across its lifecycle can also be applied to parts, sub-assemblies, or materials provided by supplier entities 602 to a manufacturing entity 604. For example, the blockchain systems that make up an example industrial blockchain ecosystem may be geographically distributed across multiple businesses that together form an integrated supply chain for a product. In an automotive example, sub-assemblies for a car produced by an automotive facility (the manufacturing entity 604 in this example) may be manufactured by respective sub-assembly suppliers (supplier entities 602). In addition to generating private blockchains 606b that record proprietary manufacturing data generated in connection with the fabrication of the sub-assemblies, blockchain-enabled industrial devices at the supplier entities 602 can generate public blockchains 606a that record information regarding manufacture of the sub-assemblies permitted to be shared with the manufacturing entity 604. These public blockchains 606a are accessible by devices at the manufacturing entity 604, and only comprise a subset of available sub-assembly manufacturing information that the supplier is contractually obligated to provide to the manufacturer. This public blockchain information can be incorporated into the manufacturer's own information tracking for the fully assembled and sold vehicles.

Figure 7:
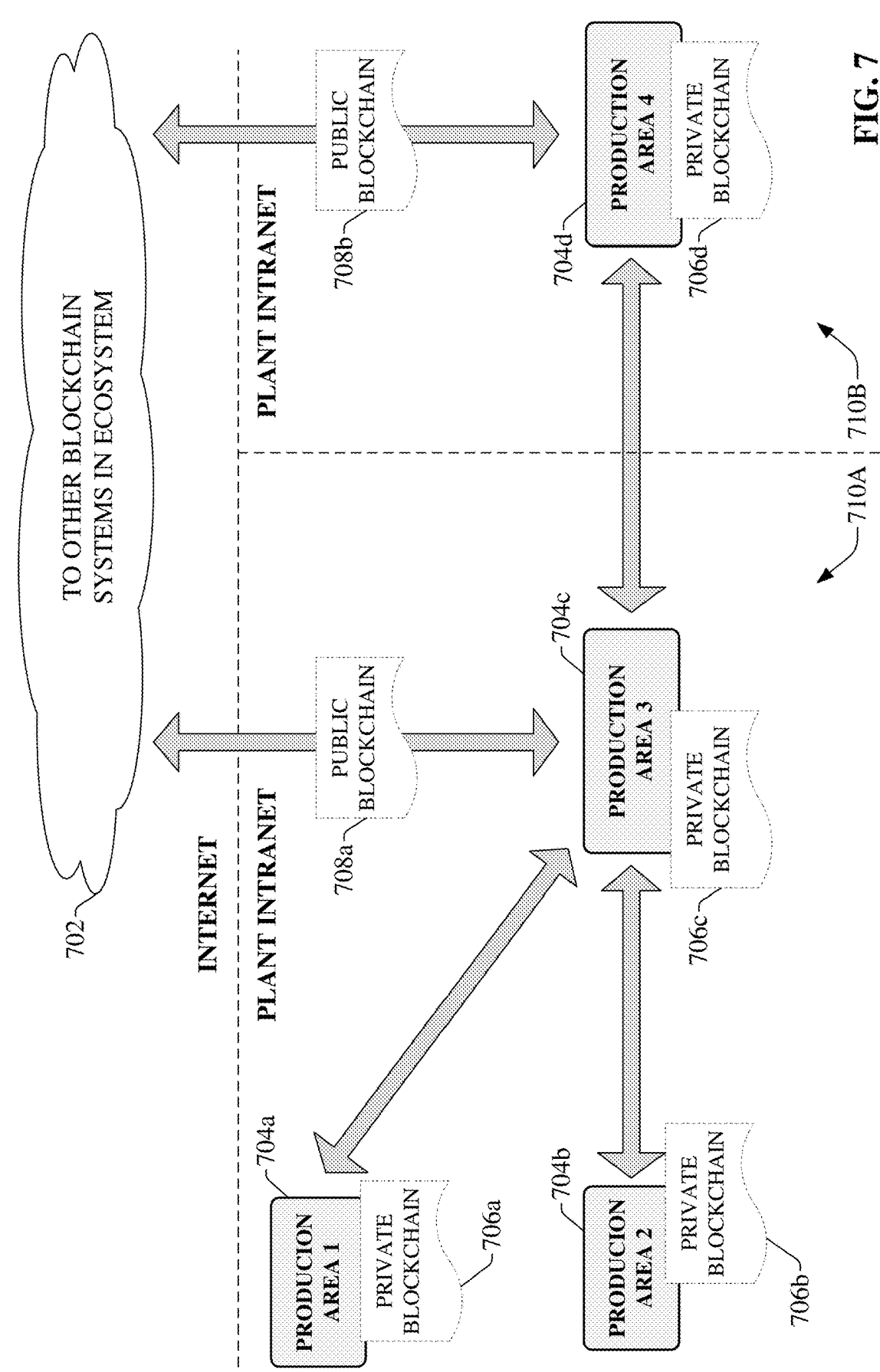
FIG. 7 is a diagram illustrating generation of blockchain data within a plant intranet in accordance with one or more embodiments described herein.

Public and/or private industrial blockchains can also be used to track manufactured products through a manufacturing facility or across multiple facilities of an industrial enterprise. FIG. 7 is a diagram illustrating generation of blockchain data within a plant intranet. The manufacturing facility depicted in FIG. 7 may correspond, for example, to manufacturing facility $710_A$, $710_B$, a combination of $710_A$ and $710_B$, or one of the supplier entities 602 depicted in the supply chain ecosystem of FIG. 6. In FIG. 7, a number of production areas 704 within a manufacturing facility—including Production Area 1 and Production Area 2— produce component parts or materials that are provided to Production Area 3, which assembles the parts or materials received from those upstream production areas. During runtime, blockchain-enabled industrial devices herein (e.g., controller 202, system 402, system 502, industrial automation equipment, etc.) that operate within Production Areas 1 and 2 (the supplier production areas) bundle transactions generated within their respective production areas in connection with production of the component parts or materials, generate and validate blocks of these transactions (e.g., collaboratively with other blockchain-enabled industrial devices within the respective production areas using consensus-based validation techniques such as practical byzantine fault tolerance, proof-of-work, or proof-of-state), and add the validated blocks to a private blockchains 706 (e.g., 706a, 706b, 706c, 706d) that are only accessible to participating devices on the plant's intranet (and not to other entities of the larger blockchain ecosystem).

Component parts or materials produced by Production Areas 1 and 2 are conveyed to Production Area 3 for assembly into either a finalized product or a sub-assembly of the final product. The blockchain-enabled industrial controller 202 or system herein that controls the industrial assets in Production Area 3 can link, via a blockchain, devices, or equipment in Production Areas 1 and 2, which are associated with the respective component parts generated in those production areas. The devices of Production Area 3 can also expand this composite blockchain by adding records of its own operations performed on the assembled product.

Figure 8:
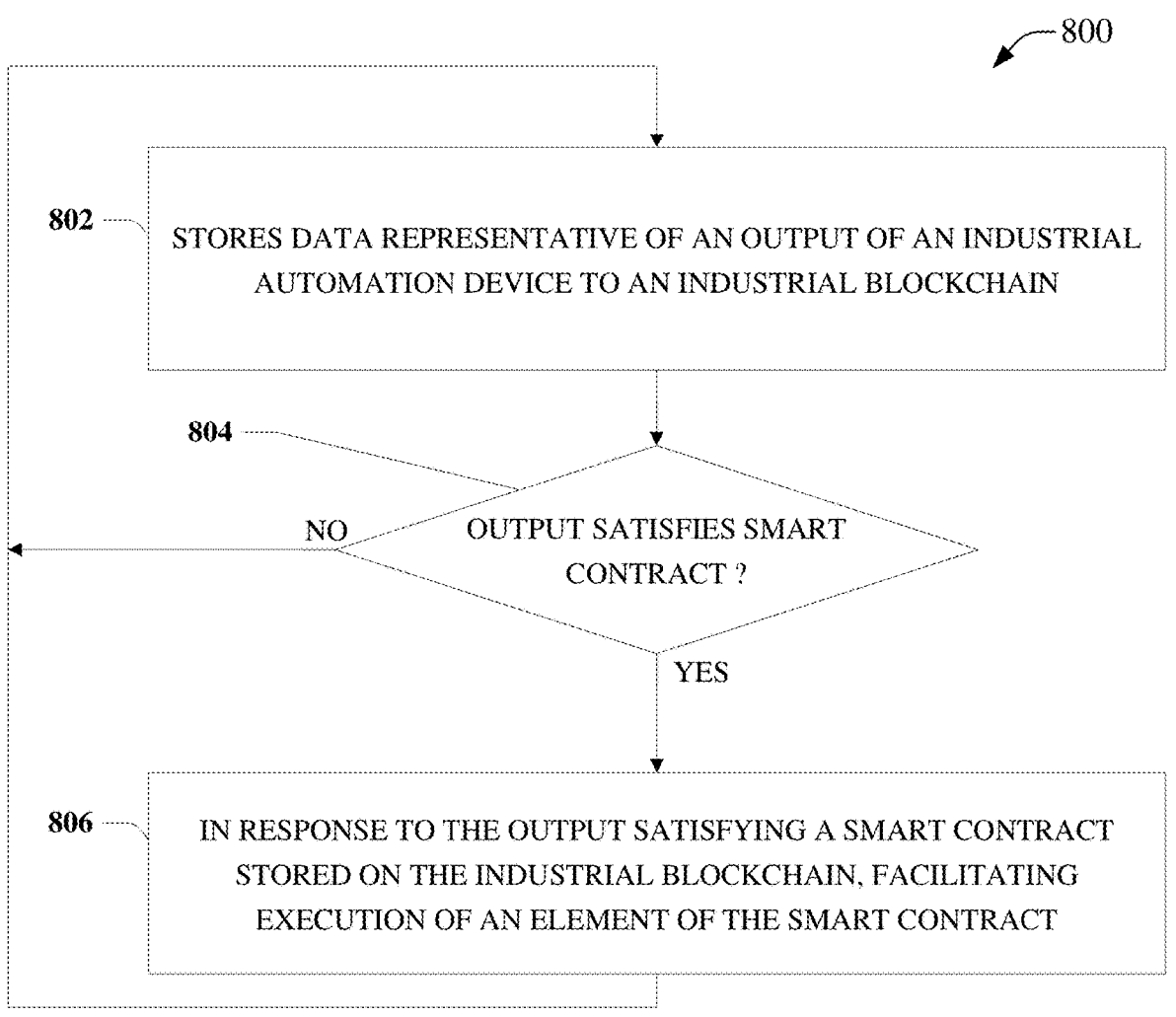
FIG. 8 is a block flow diagram of a process associated with performance-based smart contracts in industrial automation in accordance with one or more embodiments described herein.

FIG. 8 is a block flow diagram of a process 800 for performance-based smart contracts in industrial automation in accordance with one or more embodiments described herein. At 802, the blockchain component 210 can store data representative of an output of an industrial automation device to an industrial blockchain, such as industrial blockchain 230, 232, 234, etc. Such data representative of an output of an industrial automation device can comprise a quantity of products produced, quantity of components used, measure of raw materials used, time spent in production, energy consumed for production, or other suitable data. At 804, if the output satisfies a smart contract (e.g., a defined term of a smart contract 238) stored on the industrial blockchain (Y at 804), the process can proceed to 806 at which the execution component 212 facilities execution of an element of the smart contract. If at 804, the output does not satisfy the smart contract (N at 804), the process can return to 802.

FIG. 9 is a block flow diagram of a process 900 for performance-based smart contracts in industrial automation in accordance with one or more embodiments described herein. At 902, the update component 220 can, in response to receiving (e.g., via the communication component 226) an update request from a user industrial device, install an update to the user industrial device, wherein the user industrial device is communicatively coupled to the industrial system. At 904, if the installation satisfies a defined term of a smart contract stored on the industrial blockchain (Y at 904), the process can proceed to 906 at which the transfer component 214 can retrieve an electronic payment for the update, wherein the electronic payment is accessible via the smart contract. If at 904, the installation does not satisfy the defined term of the smart contract (N at 904), the process can return to 902.

Figure 10:
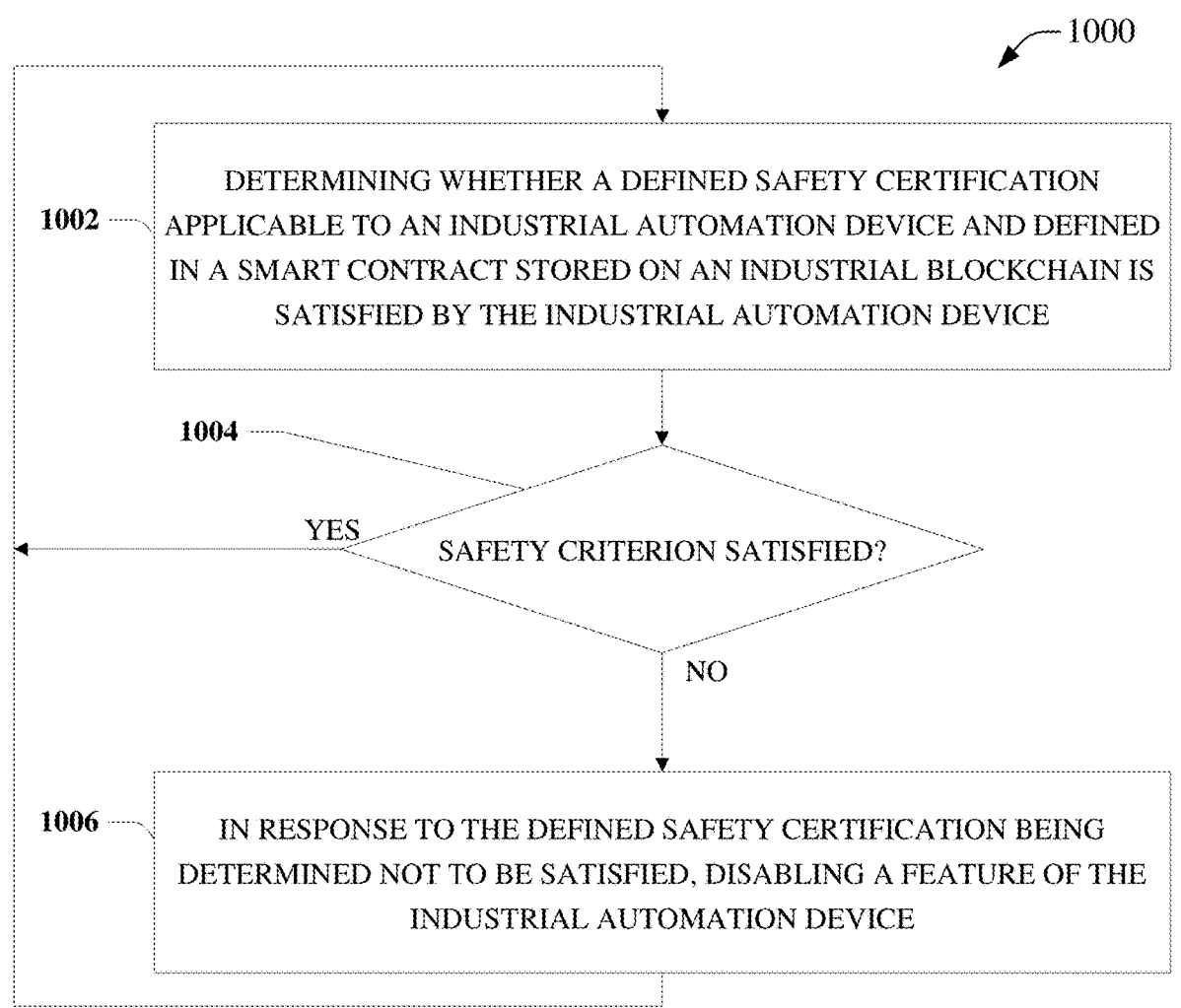
FIG. 10 is a block flow diagram of a process associated with performance-based smart contracts in industrial automation in accordance with one or more embodiments described herein.

FIG. 10 is a block flow diagram of a process 1000 for performance-based smart contracts in industrial automation in accordance with one or more embodiments described herein. At 1002, the safety component 222 can determine whether a defined safety certification applicable to an industrial automation device and defined in a smart contract stored on an industrial blockchain is satisfied by the industrial automation device. At 1004, if the defined safety criterion (e.g., a safety inspection, lockout-tagout, etc.) is determined not to be satisfied (N at 1004), the process can proceed to 1006 at which the execution component 212 disables a feature of the industrial automation device. If at 1004, the defined safety criterion is determined to be satisfied (Y at 1004), the process can return to 1002.

FIG. 11 is a block flow diagram of a process 1100 for industrial automation blockchain data management in accordance with one or more embodiments described herein. At 1102, the transfer component 214 can, using a defined conversion algorithm, convert first data from a first industrial blockchain to second data applicable to a second industrial blockchain, other than the first industrial blockchain. At 1104, the blockchain component 210 can write the second data to the second industrial blockchain. At 1106, the U.I. component 228 can render an output indicative of the writing of the second data to the second industrial blockchain.

FIG. 12 is a block flow diagram of a process 1200 for industrial automation blockchain data management in accordance with one or more embodiments described herein. At 1202, the conversion component 404 can convert, using a defined conversion algorithm, first data from an industrial blockchain to second data, wherein the first data is associated with a product manufactured using industrial automation equipment. At 1204, the storage component 406 can store the second data in a non-blockchain data storage. At 1206, the U.I. component 228 can render an output indicative of the writing of the second data to the non-blockchain data storage.

Figure 13:
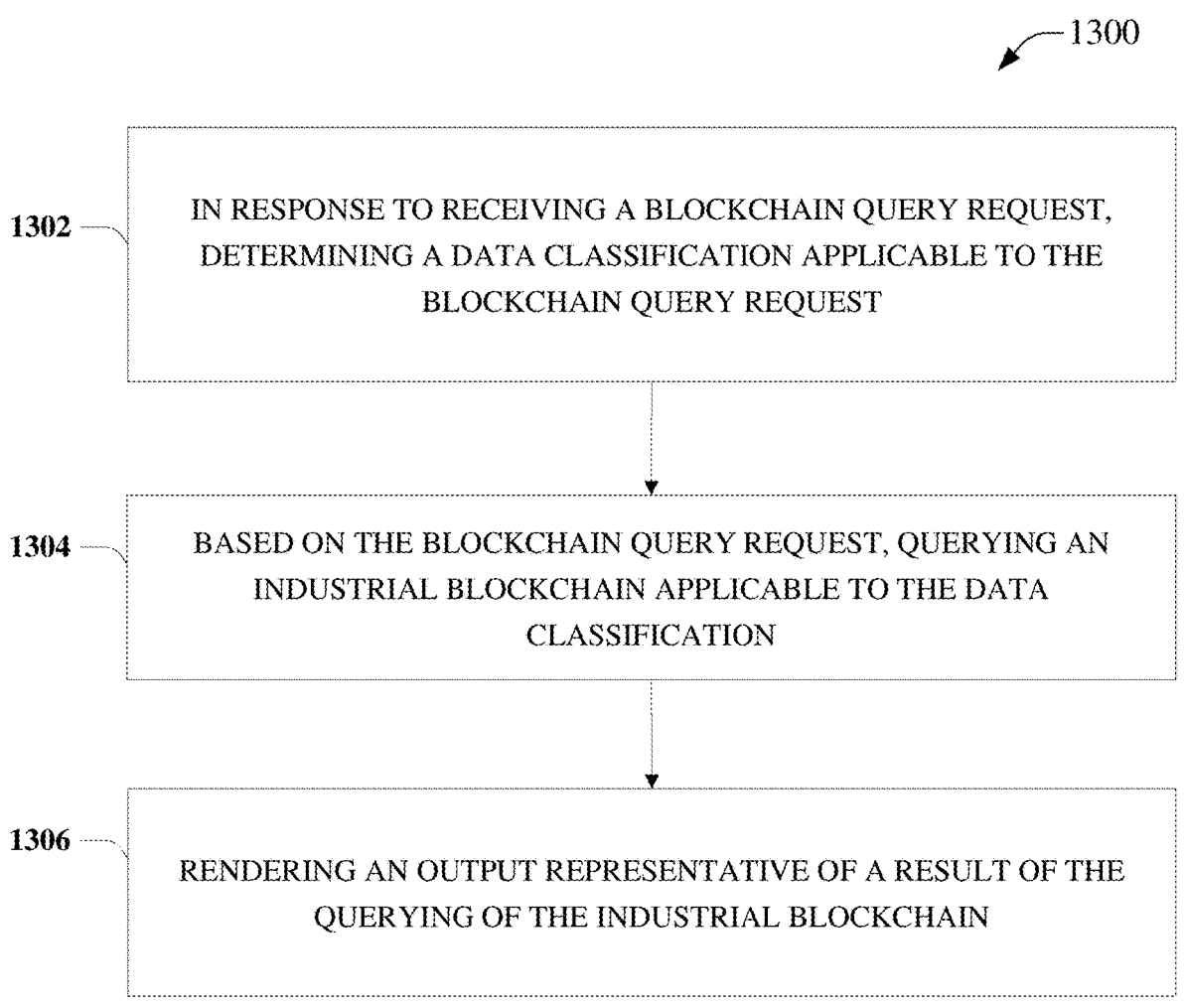
FIG. 13 is a block flow diagram of a process associated with industrial automation blockchain data management in accordance with one or more embodiments described herein.

FIG. 13 is a block flow diagram of a process 1300 for industrial automation blockchain data management in accordance with one or more embodiments described herein. At 1302, the classification component 408 can, in response to receiving a blockchain query request, determine a data classification applicable to the blockchain query request. At 1304, the blockchain component 210 can, based on the blockchain query request, query an industrial blockchain applicable to the data classification. At 1306, the U.I. component 228 can render an output representative of a result of the querying of the industrial blockchain.

Figure 14:
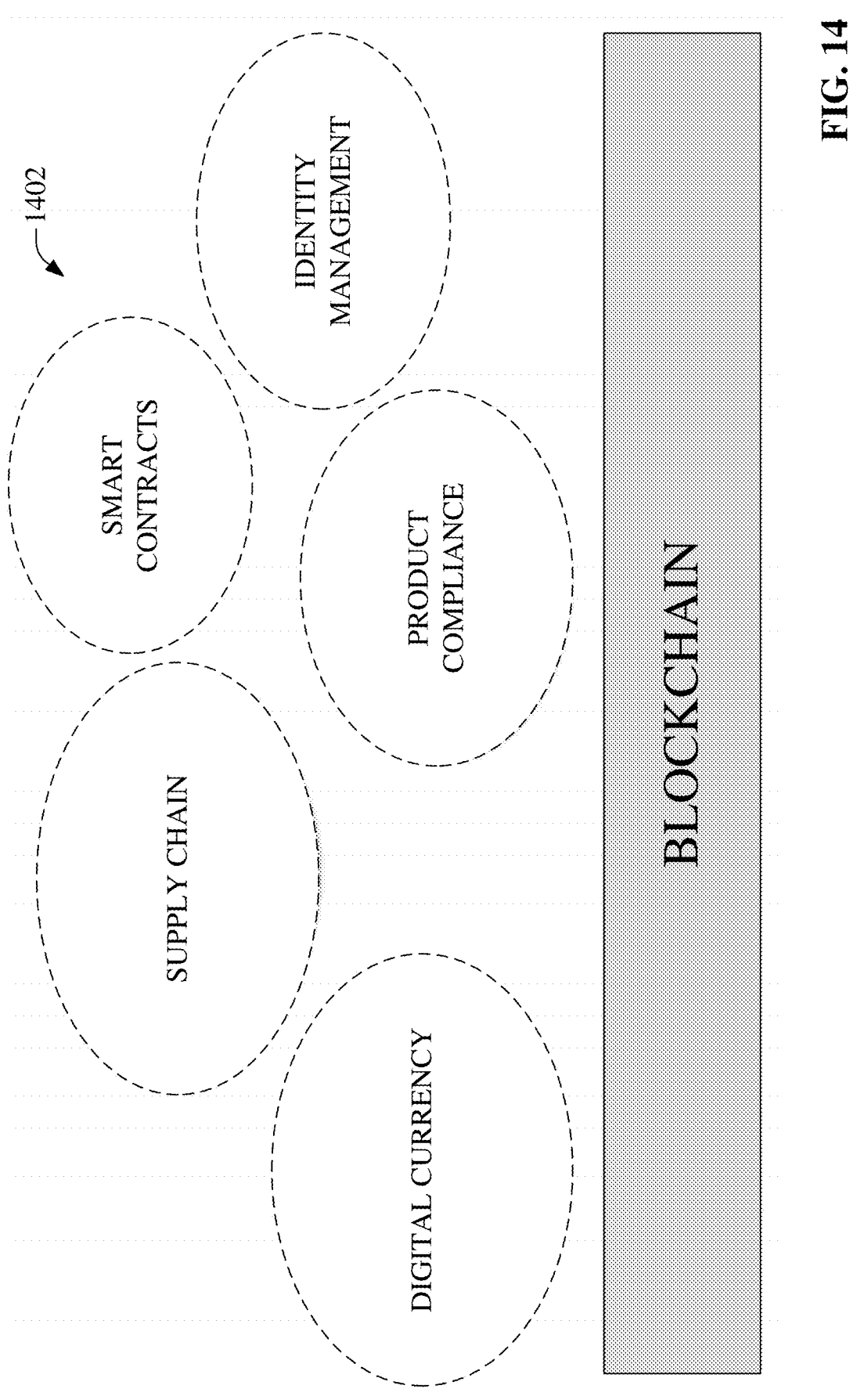
FIG. 14 is a generalized high-level diagram illustrating the relationship between blockchain technology and applications that can leverage blockchains in accordance with one or more embodiments described herein.
Figure 15:
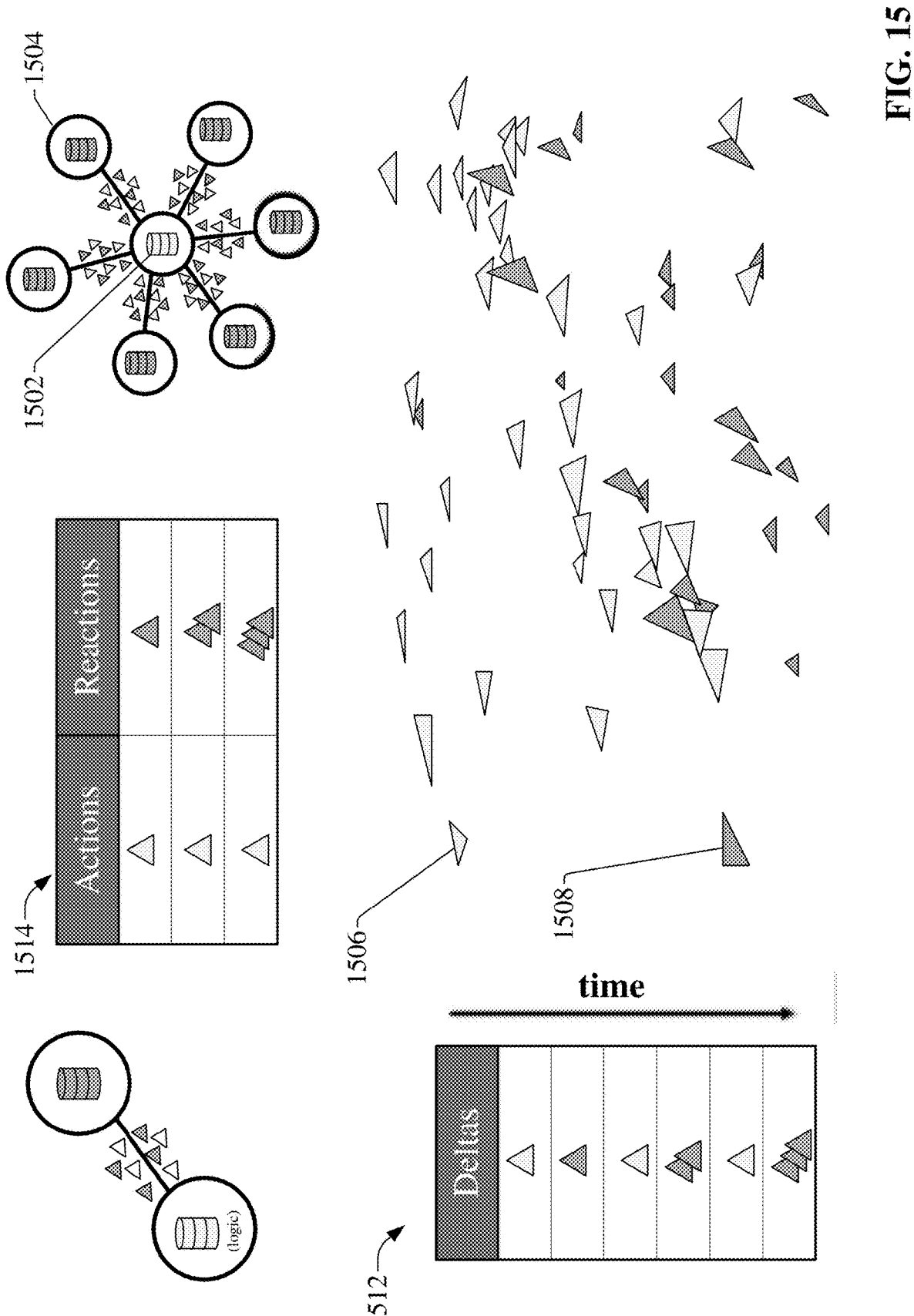
FIG. 15 is a graphic illustrating a centralized model for accessing and modifying data in accordance with one or more embodiments described herein.

A general, high-level overview of blockchain technology is now provided as a background for the industrial-specific applications of blockchain technology discussed herein. FIG. 14 is a generalized high-level diagram illustrating the relationship between blockchain technology and applications 1402 that can leverage blockchains. In general, blockchain is a foundational technology upon which applications can be built to leverage the technology. Digital currency such as Bitcoin is an example application that uses a public blockchain to act as a distributed ledger in a peer-to-peer network. Blockchain technology is also used to implement smart contracts, which allow a set of contractual rules to be programmed and enforced by a network of peer-to-peer devices without requiring a third-party mediator or broker. As discussed herein, one or more embodiments of the present disclosure can include industrial devices and applications that leverage blockchain technology to perform supply chain tracking, verify product compliance, perform identity management, monitor, and record information relating to local manufacturing operations within a single facility (e.g., within the bounds of the plant's intranet), or other such industrial functions.

Figure 19:
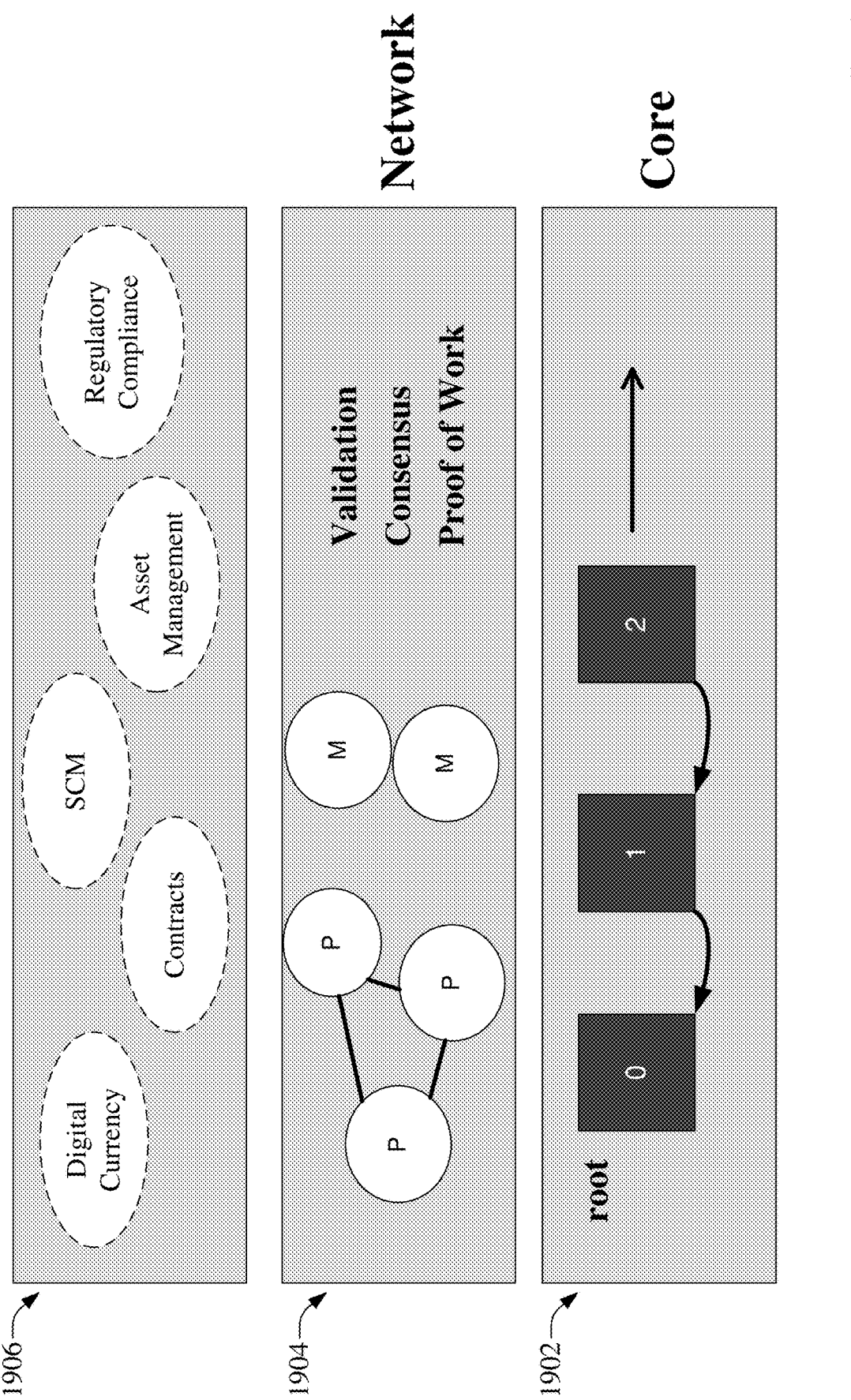
FIG. 19 is a diagram illustrating a generalized architecture of an example blockchain platform in accordance with one or more embodiments described herein.

Blockchain-based platforms can provide access to data from multiple parties in a decentralized manner, in contrast to platforms that share data using a centralized model. FIG. 19 is a graphic illustrating a centralized model for accessing and modifying data. According to this centralized model, there is a single "golden copy" 1502 of the data being viewed and acted upon by one or more entities 1504 (e.g., systems running applications that leverage the data represented by the golden copy 1502, client devices operated by respective users, etc.). Any of the entities 1504 can copy data maintained on the golden copy 1502 as a whole or in part. This golden copy 1502 of the data model is updated by commanding state changes to the model (an example technique for communicating state changes of objects between components is described in U.S. Pat. No. 9,864,365, which is incorporated herein by reference). These state change instructions are referred to herein as "actions" 1506. Copies and views of the golden copy 1502 remain synchronized by observing changes to the golden copy 1502 of the model. These observed changes are referred to herein as "reactions" 1508. Table 1514 represents a set of actions performed on the data and corresponding observed reactions accumulated as a result of the actions. The collection of actions 1506 and reactions 1508 can be viewed as a set of changes or deltas 1510 ordered by time, as represented by table 1512. This set of deltas 1510 can be "played back" by any number of entities to obtain the same consistent data model, with the golden copy 1502 being the model that is trusted by everyone.

Figure 16:
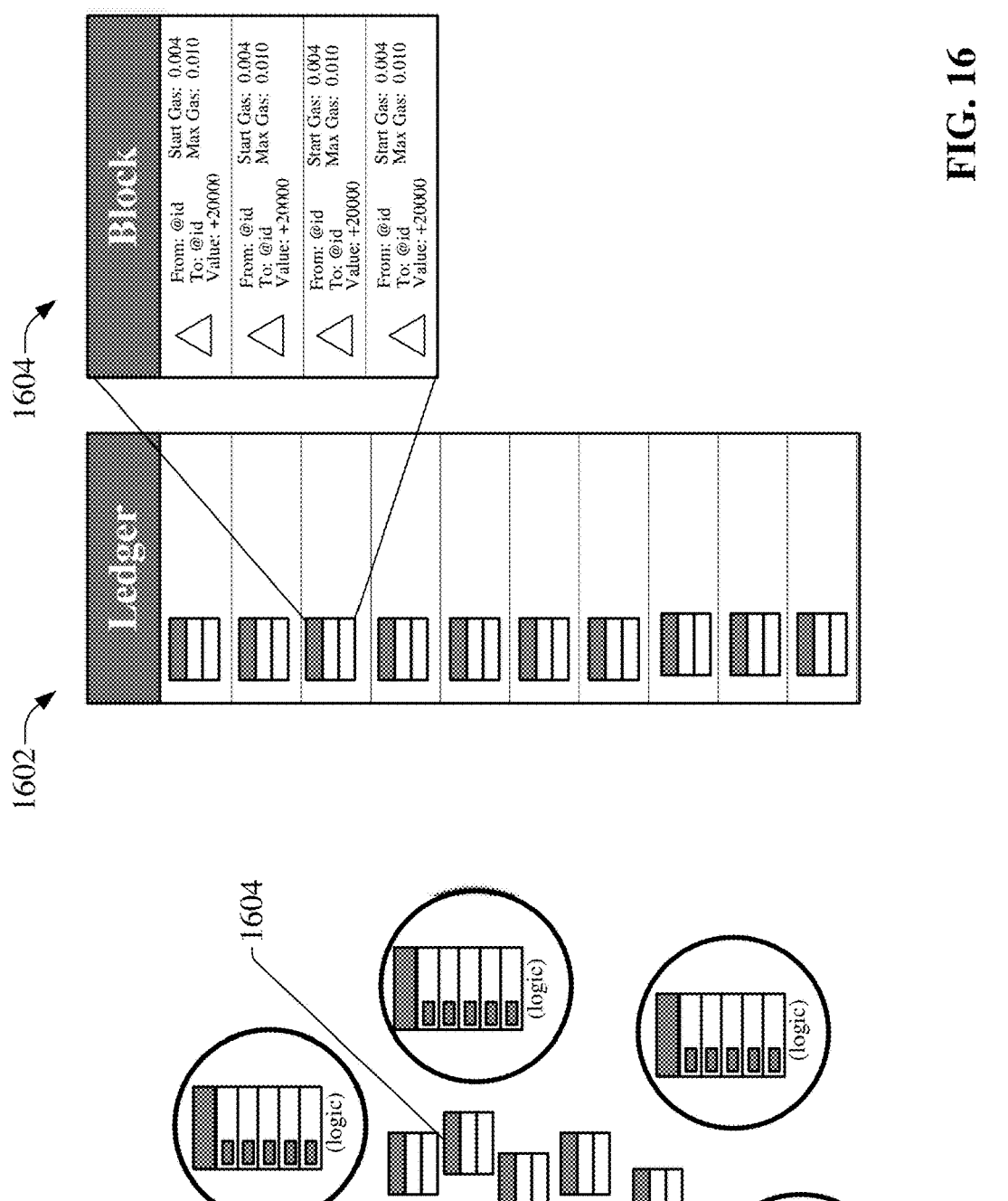
FIG. 16 is a graphic illustrating a decentralized model for accessing and modifying data in accordance with one or more embodiments described herein.

By contrast, blockchain-driven platforms decentralize the data model, eliminating the need to maintain a golden copy 1502 or distributing the multiple coordinated versions of the truth. FIG. 16 is a graphic illustrating a decentralized model. In a decentralized model, all entities 1606 that interact with the data have a copy of the data, and all entities work to keep the data model's transactions ordered and consistent. Blocks 1604 of changes to the data are recorded as a transaction. A distributed ledger 1602 of all these changes is maintained by all entities 1606 (or nodes or participants) that participate in the platform. If all entities 1606 apply the changes to their own copy of the data, then the copies remain consistent across the entities 1606 without the need for a single golden copy. Each entity maintains a copy of the ledger 1602, which represents a continuous chain of transaction blocks 1604, hence the term "blockchain." When a transaction is performed on the data by one of the entities 1606, all entities 1606 process the transaction and determine the validity of the transaction. If a consensus among the entities 1606 is reached regarding the transaction's validity, each entity updates its copy of the ledger 1602 accordingly.

Figure 17:
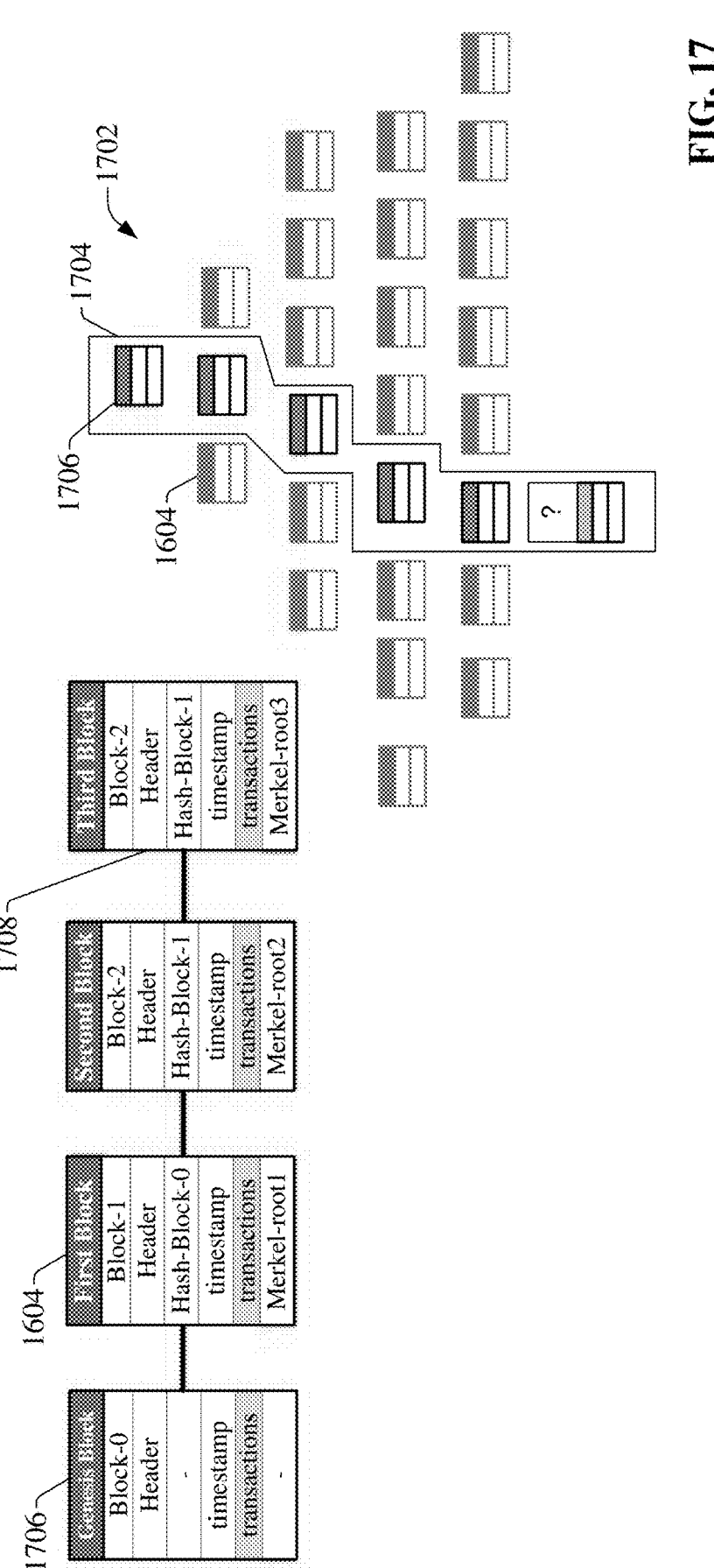
FIG. 17 is a graphic illustrating an example blockchain architecture in accordance with one or more embodiments described herein.

A blockchain consists of a data structure that orders blocks and links the blocks cryptographically, thereby acting as an immutable, verifiable, distributed ledger. Blockchains require no central authority; instead, trust is established and enforced cryptographically, with participating nodes (e.g., devices associated with entities 1606) acting as a consortium and voting on the validity of a block using a consensus mechanism to manage the distributed ledger. FIG. 17 is a graphic illustrating a blockchain architecture. Blockchains are a linked hierarchical list 1702 of transaction blocks 1604, where chains of related, linked transaction blocks 1604 within the hierarchy (e.g., chain 1704) stem from an initial genesis block 1706. Each block 1604 has a cryptographic identity, which is calculated by the header data 1708 in the block. Each block 1604 contains the hash of the previous block in the chain.

Figure 18:
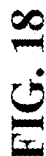
FIG. 18 is a diagram illustrating a general architecture of a blockchain in accordance with one or more embodiments described herein.

FIG. 18 is a diagram illustrating a general architecture of an example blockchain. Data 1810 associated with the block's transactions is hashed, and the collection of transaction data 1810 and their associated hashes 1808 create a Merkle tree 1806 of hashes 1808 (only two items of data 1810 are shown in FIG. 18 for clarity; however, a block 1604 can be associated with more than two transactions). In the illustrated example, each data item 1810a and 1810b is hashed to yield two corresponding hash values 1808a and 1808b. These two hashes 1808a and 1808b are combined into another hash value 1802 at the next higher level in the Merkle tree hierarchy. Hash values at a given level of the Merkle tree can be combined with other hash values on that level to yield hash values at the next higher level until the top of the Merkle tree hierarchy is reached.

The Merkle tree 1806 is stored separately from the block 1604, and only the root fingerprint 1812 (the top hash) is stored in the block 1604. Each block 1604 also contains a hash 1804 of the content of the immediately preceding block in the chain. For each block 1604, the Merkle tree of hashes 1808 and the hash 1804 of the previous block in the chain are used to create the hash 1802 for the block. The data 1810 is stored in the Merkle tree 1806 separately from the block 1604, with the root fingerprint 1812 being the only part of the Merkle tree 1806 stored in the block 1604. This nesting of cryptographic hash values yields a digital fingerprint that renders unauthorized tampering difficult. Compounded with the chaining of transaction blocks 1604, the blockchain becomes increasingly difficult to hack, producing a level of trustworthiness that increases over time. Improperly modifying a block 1604 would require tampering with the entire transaction history, rendering tampering nearly impossible. In this way, a verifiable, tamper-proof ledger of transactions can be efficiently maintained.

FIG. 19 is a diagram illustrating a generalized architecture of a blockchain platform. The core blockchain functionality 1902 (the blockchain creation and management features described above) is implemented on a network 1904 of participating devices or nodes. The core blockchain ledger is distributed throughout the network, and is independently validated by network members. In a public model, the network 1904 is purely peer-to-peer with no central trust authority. Instead of a central trust authority, network peers are responsible for validation and decentralized consensus for acceptance of new transactions (that is, new blocks 1604 representing new transactions) into the blockchain. Public blockchains are secured by the amount of work required to create a new block 1604. This proof-of-work model can prevent network peers from improperly hijacking or tampering with the blockchain. Private blockchain models—including blockchain applications used within an industrial facility as will be described herein—can employ a central authority to manage the ledger, user identities, and creation of new blocks.

Applications 1906 that employ blockchains are constructed on top of the network layer, which exposes the core blockchain functions. Participants in the network 1904 (the peer devices) are uniquely identified with digital signatures granted by the network. Participant identities may be anonymous depending on the type of blockchain network model (e.g., public, or private). In all cases, transactions are published, visible, and verifiable on the blockchain.

Figure 20:
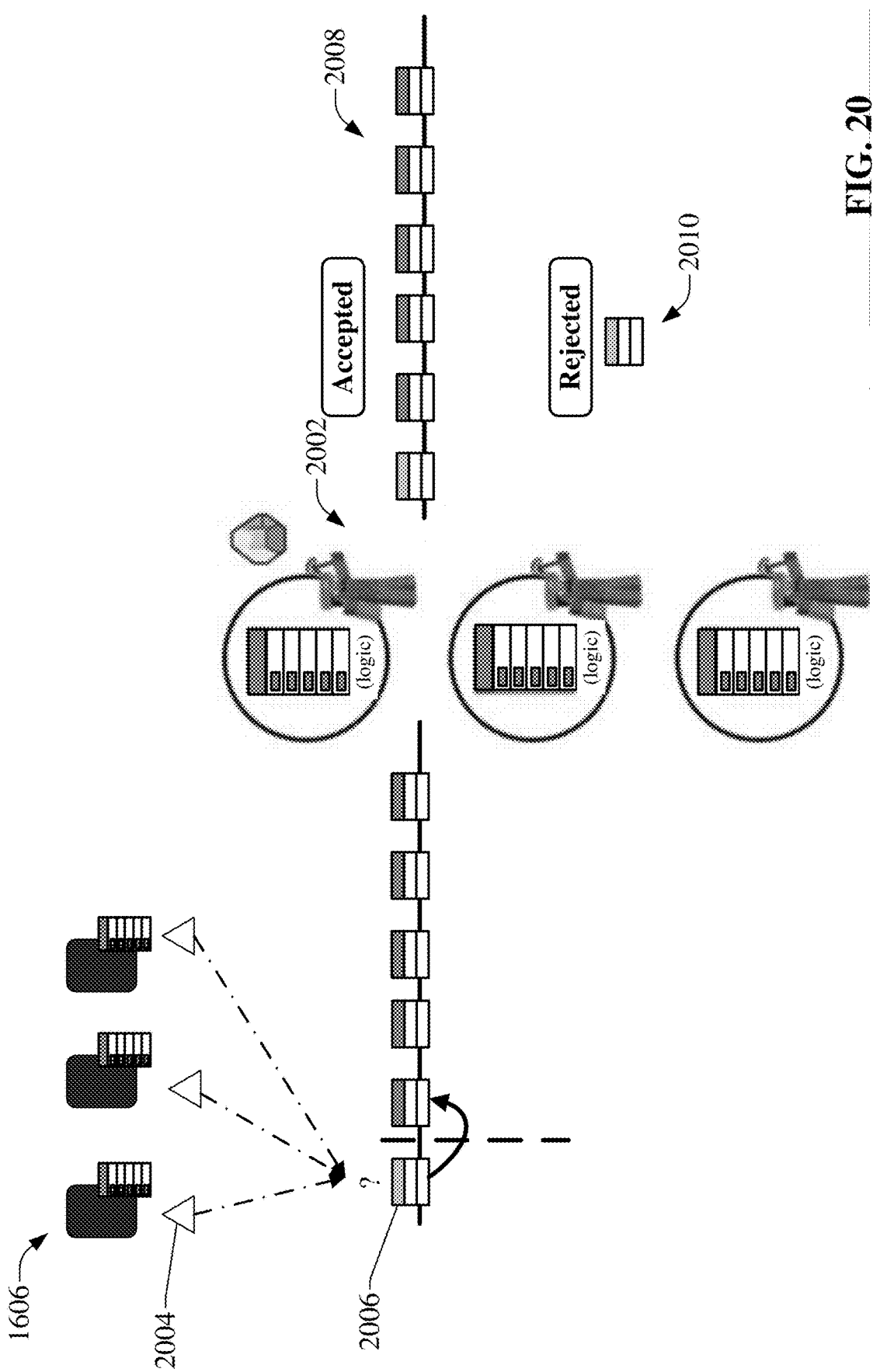
FIG. 20 is a generalized diagram illustrating creation of blocks and validation of blocks via consensus-based validation in accordance with one or more embodiments described herein.

FIG. 20 is a generalized diagram illustrating creation of blocks and validation of blocks via consensus-based validation. Single transactions 2004 performed by entities 1606 (participants in the blockchain network) are gathered into blocks 2006 by programmatic components executing on the entities 1606 referred to as "miners" 2002. Miners 2002 possess the entire Merkle tree for the gathered transactions and compete to build a valid block out of the Merkle tree. The first miner 2002 to create a block is rewarded. The block is then validated by the other entities 1606 based on the hashes. If valid, the block is added to the blockchain 2008.

Since these blocks 2006 are created and validated in parallel, different versions of the truth can be generated. In these cases, the peers (entities 1606) vote on which block should be used. Regardless of the final set of blocks, all choices are most likely valid. The participants in the blockchain network can validate transactions and reject invalid or nefarious transactions 2010 (e.g., spending the same money twice in the case of digital currency applications). The system is ultimately consistent and valid.

Some blockchain platforms are also capable of implementing and enforcing smart contracts, which define rules or agreements between participants in the blockchain network. FIG. 21 is a generalized diagram illustrating implementation of smart contracts within a blockchain-driven system. In general, smart contracts are sets of logic 2102 that execute on the blockchain and generate new types of transactions in accordance with rules defined by the logic. The smart contract logic 2102 is executed by the participants of the blockchain. When a smart contract transaction 2104 is generated, the logic 2102 executes on the transaction 2104 and can create several new transactions 2106 designed to satisfy the contract. On the Ethereum platform, units of processing "fees" must be provided by an initiator of a smart contract transaction in order to execute the transaction. On the Ethereum platform, these fees are referred to as Ether or "gas." The amount of gas required to execute a transaction is generally proportional to the amount of work required to execute the transaction. The more complex the transaction, the more gas must be spent to execute the transaction. These processing "fees" can be used to prioritize transactions based on relative values of the transactions, and can also protect against Denial of Service attacks (e.g., attacks that place the contract's logic in an infinite loop). Work on selected transactions can be prioritized by assigning extra gas to the transactions.

Figure 22:
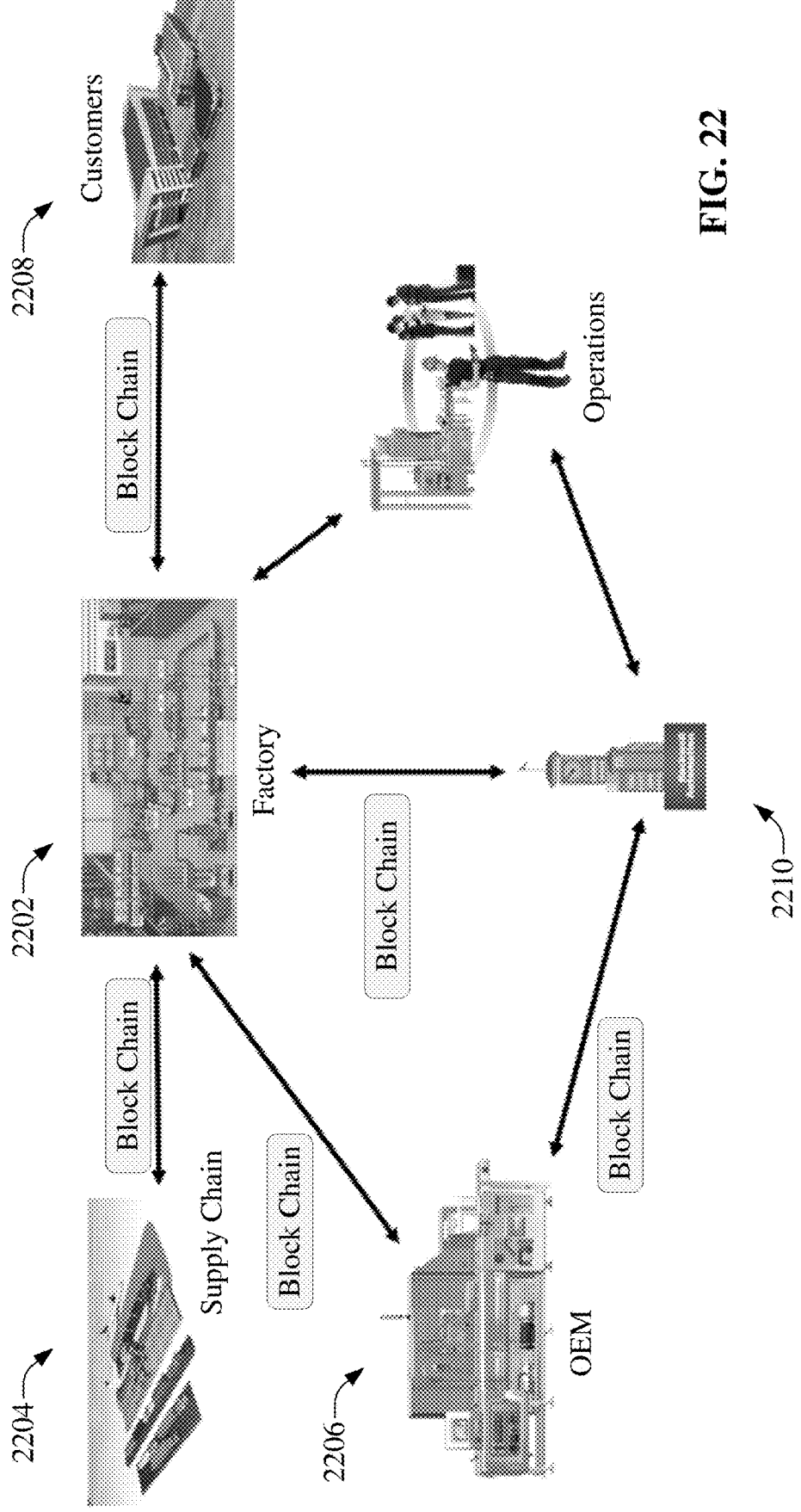
FIG. 22 is a high-level overview of entities and enterprises within an industrial supply and distribution chain within which industrial-specific blockchains can be utilized in accordance with one or more embodiments described herein.

Various embodiments described herein leverage aspects of blockchain platforms within the context of industrial facilities, industrial enterprises, and manufacturing and distribution supply chains. To this end, industrial devices such as industrial controllers, motor drives, data historians, telemetry devices, HMIs, and other such industrial devices are configured to support creation, validation, and sharing of blockchains. FIG. 22 is a high-level overview of entities and enterprises within an industrial supply and distribution chain within which industrial-specific blockchains can be utilized. In general, blockchain-enabled industrial devices can utilize blockchain technology in connection with such tasks as asset and product lifecycle management within a factory 2202; device, machine, line, or factory configuration integrity tracking; regulatory compliance verification; auditing of lock out/tag out safety procedures within the factory 2202; customer/partner entitlements management, management and tracking of supply chains 2204 across enterprise boundaries; inventory management across a supply chain; contracts management; tracking of manufactured products across enterprises of a supply chain or within a factory 2202; or other applications to be discussed herein.

The use of blockchains between industrial enterprises can also open the possibility of subscription-based serves between OEMs 2206 and owners of factories 2202, or between a manufacturing entity and its customers. Blockchains can also be used to track manufactured products to the end consumers 2208, and public blockchain data generated by a product's traversal through the manufacturing and supply chain can be accessed by consumers 2208 to obtain information about their purchased products. A device vendor 2210 can manufacture and provide blockchain-enabled industrial devices that are used within industrial factories 2202, OEM facilities 2206, and other enterprises to facilitate blockchain-driven industrial applications. The device vendor 2210 can also act as a trust authority for blockchain-driven systems that are implemented by the blockchain-enabled industrial devices. Robust identity management for organizations, people, and products that participate in an industrial blockchain system can ensure the trustworthiness of the participants and the blockchain data. Both public and private blockchain models can be implemented depending on the needs of the industrial application using the platform.

Figure 23:
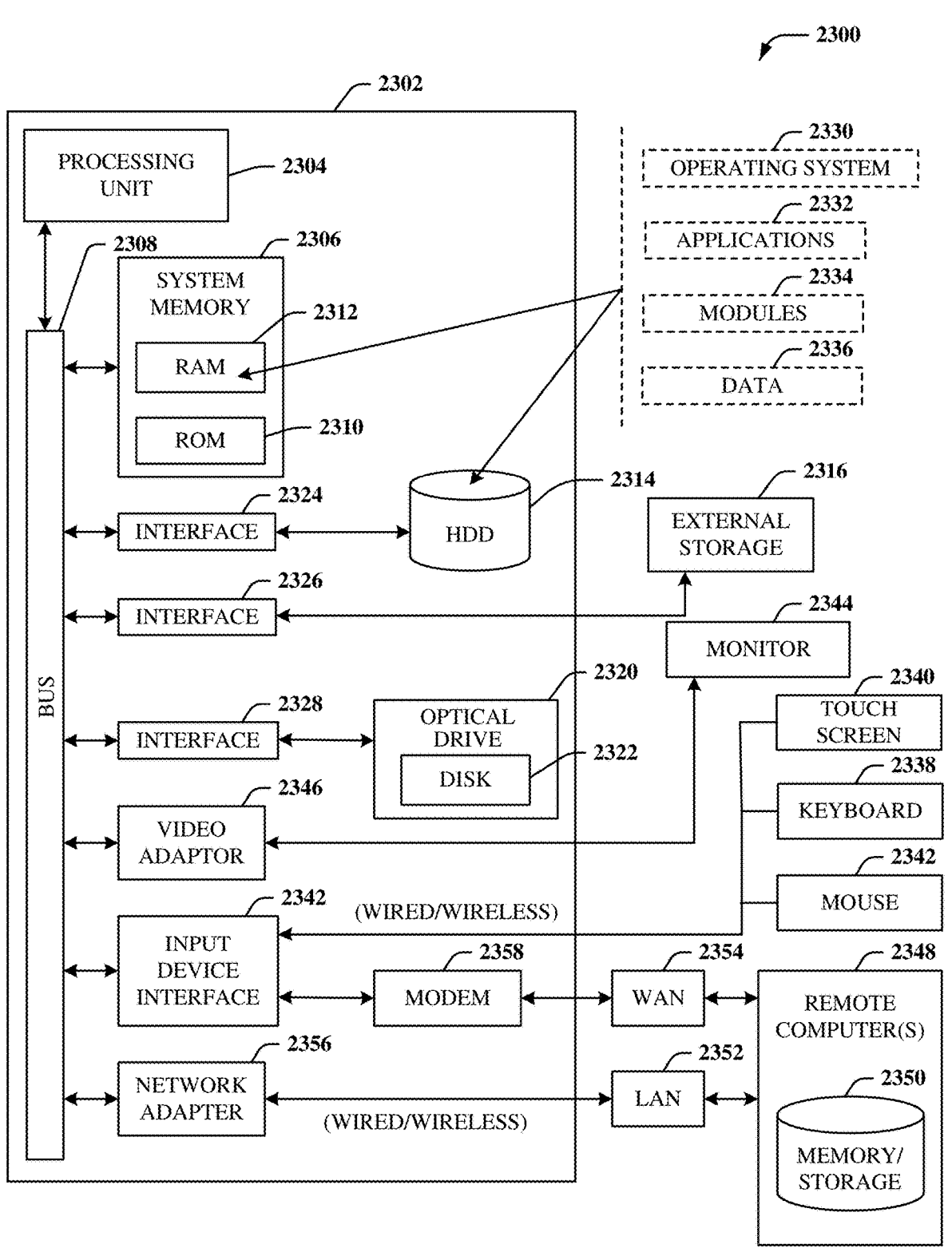
FIG. 23 is an example computing environment in accordance with one or more embodiments described herein.
Figure 24:
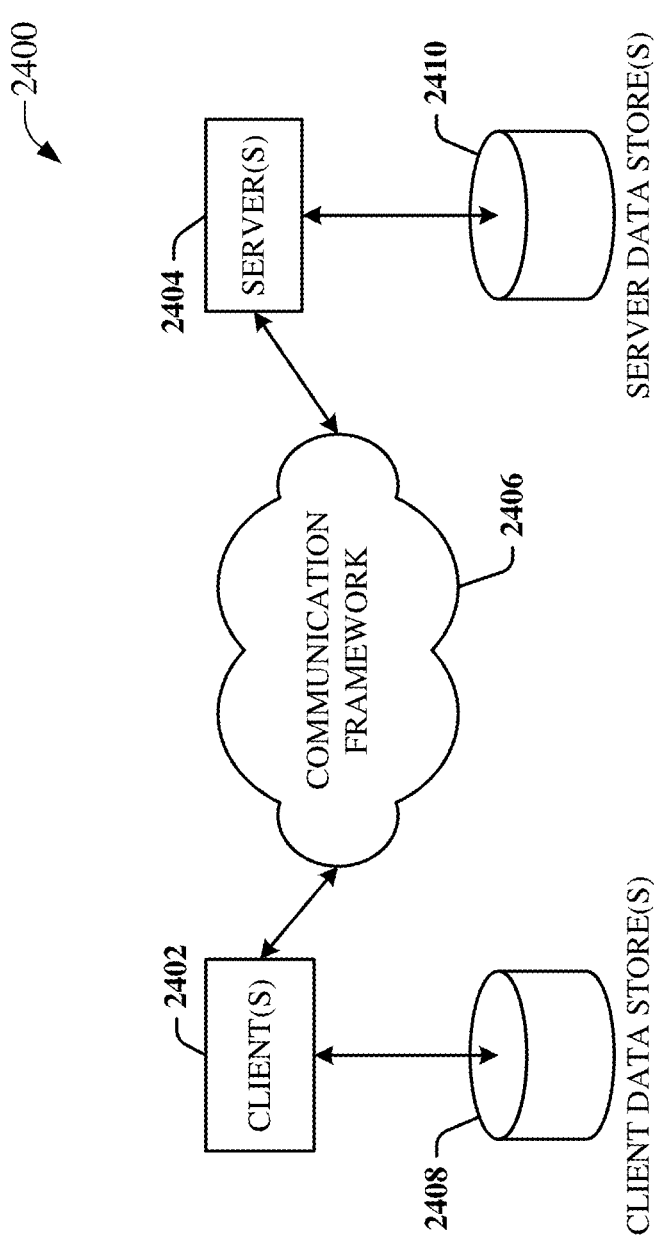
FIG. 24 is an example networking environment in accordance with one or more embodiments described herein.

In order to provide a context for the various aspects of the disclosed subject matter, FIGS. 23 and 24 as well as the following discussion are intended to provide a brief, general description of a suitable environment in which the various aspects of the disclosed subject matter can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 23, the example environment 2300 for implementing various embodiments of the aspects described herein includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi-processor architectures can also be employed as the processing unit 2304.

The system bus 2308 can be any of several types of bus structure that can further interconnect to a memory bus (with or without a memory controller), a peripheral bus, and a local bus using any of a variety of commercially available bus architectures. The system memory 2306 includes ROM 2310 and RAM 2312. A basic input/output system (BIOS) can be stored in a non-volatile memory such as ROM, erasable programmable read only memory (EPROM), EEPROM, which BIOS contains the basic routines that help to transfer information between elements within the computer 2302, such as during startup. The RAM 2312 can also include a high-speed RAM such as static RAM for caching data.

The computer 2302 further includes an internal hard disk drive (HDD) 2314 (e.g., EIDE, SATA), one or more external storage devices 2316 (e.g., a magnetic floppy disk drive (FDD) 2316, a memory stick or flash drive reader, a memory card reader, etc.) and an optical disk drive 2320 (e.g., which can read or write from a CD-ROM disc, a DVD, a BD, etc.). While the internal HDD 2314 is illustrated as located within the computer 2302, the internal HDD 2314 can also be configured for external use in a suitable chassis (not shown). Additionally, while not shown in environment 2300, a solid state drive (SSD) could be used in addition to, or in place of, an HDD 2314. The HDD 2314, external storage device(s) 2316 and optical disk drive 2320 can be connected to the system bus 2308 by an HDD interface 2324, an external storage interface 2326 and an optical drive interface 2328, respectively. The interface 2324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2312, including an operating system 2330, one or more application programs 2332, other program modules 2334 and program data 2336. All or portions of the operating system, applications, modules, and/or data can also be cached in the RAM 2312. The systems and methods described herein can be implemented utilizing various commercially available operating systems or combinations of operating systems.

Computer 2302 can optionally comprise emulation technologies. For example, a hypervisor (not shown) or other intermediary can emulate a hardware environment for operating system 2330, and the emulated hardware can optionally be different from the hardware illustrated in FIG. 23. In such an embodiment, operating system 2330 can comprise one virtual machine (VM) of multiple VMs hosted at computer 2302. Furthermore, operating system 2330 can provide runtime environments, such as the Java runtime environment or the .NET framework, for application programs 2332. Runtime environments are consistent execution environments that allow application programs 2332 to run on any operating system that includes the runtime environment. Similarly, operating system 2330 can support containers, and application programs 2332 can be in the form of containers, which are lightweight, standalone, executable packages of software that include, e.g., code, runtime, system tools, system libraries and settings for an application.

Further, computer 2302 can be enable with a security module, such as a trusted processing module (TPM). For instance, with a TPM, boot components hash next in time boot components, and wait for a match of results to secured values, before loading a next boot component. This process can take place at any layer in the code execution stack of computer 2302, e.g., applied at the application execution level or at the operating system (OS) kernel level, thereby enabling security at any level of code execution.

A user can enter commands and information into the computer 2302 through one or more wired/wireless input devices, e.g., a keyboard 2338, a touch screen 2340, and a pointing device, such as a mouse 2342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2304 through an input device interface 2344 that can be coupled to the system bus 2308, but can be connected by other interfaces, such as a parallel port, an IEEE 1394 serial port, a game port, a US B port, an IR interface, a BLUETOOTH® interface, etc.

A monitor 2344 or other type of display device can be also connected to the system bus 2308 via an interface, such as a video adapter 2346. In addition to the monitor 2344, a computer typically includes other peripheral output devices (not shown), such as speakers, printers, etc.

The computer 2302 can operate in a networked environment using logical connections via wired and/or wireless communications to one or more remote computers, such as a remote computer(s) 2348. The remote computer(s) 2348 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2350 is illustrated. The logical connections depicted include wired/wireless connectivity to a local area network (LAN) 2352 and/or larger networks, e.g., a wide area network (WAN) 2354. Such LAN and WAN networking environments are commonplace in offices and companies, and facilitate enterprise-wide computer networks, such as intranets, all of which can connect to a global communications network, e.g., the Internet.

When used in a LAN networking environment, the computer 2302 can be connected to the local network 2352 through a wired and/or wireless communication network interface or adapter 2356. The adapter 2356 can facilitate wired or wireless communication to the LAN 2352, which can also include a wireless access point (AP) disposed thereon for communicating with the adapter 2356 in a wireless mode.

When used in a WAN networking environment, the computer 2302 can include a modem 2358 or can be connected to a communications server on the WAN 2354 via other means for establishing communications over the WAN 2354, such as by way of the Internet. The modem 2358, which can be internal or external and a wired or wireless device, can be connected to the system bus 2308 via the input device interface 2342. In a networked environment, program modules depicted relative to the computer 2302 or portions thereof, can be stored in the remote memory/storage device 2350. It will be appreciated that the network connections shown are example and other means of establishing a communications link between the computers can be used.

When used in either a LAN or WAN networking environment, the computer 2302 can access cloud storage systems or other network-based storage systems in addition to, or in place of, external storage devices 2316 as described above. Generally, a connection between the computer 2302 and a cloud storage system can be established over a LAN 2352 or WAN 2354 e.g., by the adapter 2356 or modem 2358, respectively. Upon connecting the computer 2302 to an associated cloud storage system, the external storage interface 2326 can, with the aid of the adapter 2356 and/or modem 2358, manage storage provided by the cloud storage system as it would other types of external storage. For instance, the external storage interface 2326 can be configured to provide access to cloud storage sources as if those sources were physically connected to the computer 2302.

The computer 2302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 24 is a schematic block diagram of a sample computing environment 2400 with which the disclosed subject matter can interact. The sample computing environment 2400 includes one or more client(s) 2402. The client(s) 2402 can be hardware and/or software (e.g., threads, processes, computing devices). The sample computing environment 2400 also includes one or more server(s) 2404. The server(s) 2404 can also be hardware and/or software (e.g., threads, processes, computing devices). The servers 2404 can house threads to perform transformations by employing one or more embodiments as described herein, for example. One possible communication between a client 2402 and servers 2404 can be in the form of a data packet adapted to be transmitted between two or more computer processes. The sample computing environment 2400 includes a communication framework 2406 that can be employed to facilitate communications between the client(s) 2402 and the server(s) 2404. The client(s) 2402 are operably connected to one or more client data store(s) 2408 that can be employed to store information local to the client(s) 2402. Similarly, the server(s) 2404 are operably connected to one or more server data store(s) 2410 that can be employed to store information local to the servers 2404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a transfer component that, using a defined conversion algorithm, converts first data from a first industrial blockchain to second data applicable to a second industrial blockchain, other than the first industrial blockchain;
a blockchain component that writes the second data to the second industrial blockchain; and
a user interface component that renders, visually or audibly, an output indicative of the writing of the second data to the second industrial blockchain,
wherein a technology type of at least the first industrial blockchain comprises a hybrid blockchain, other than a private blockchain and other than a public blockchain, and
wherein the second industrial blockchain stores data representative of a product generated using an industrial automation device, and wherein the first industrial blockchain stores data representative of a component of the product.

2. The system of claim 1, wherein the second industrial blockchain comprises a public blockchain.

3. The system of claim 1, wherein the second industrial blockchain comprises a private blockchain.

4. The system of claim 1, wherein the second industrial blockchain comprises a hybrid blockchain.

5. The system of claim 1, wherein the second industrial blockchain comprises a consortium blockchain.

6. The system of claim 1, wherein the first industrial blockchain comprises a first blockchain technology type, and wherein the second industrial blockchain comprises a second technology type, other than the first blockchain technology type.

7. The system of claim 1,
wherein the data representative of the product comprises a quantity of the product produced by the industrial automation device, time spent in production of the product using the industrial automation device, or energy consumed by the industrial automation device in production of the product, or wherein the data representative of the component of the product comprises a quantity of the component used in the product, or a measure of a raw material used in production of the product.

8. A method, comprising:
using a defined conversion algorithm, converting, by an industrial system comprising at least one processor, first data from a first industrial blockchain to second data applicable to a second industrial blockchain, other than the first industrial blockchain;
writing, by the industrial system, the second data to the second industrial blockchain; and
rendering, visually or audibly by the industrial system, an output indicative of the writing of the second data to the second industrial blockchain,
wherein a technology type of at least the first industrial blockchain comprises a hybrid blockchain, other than a private blockchain and other than a public blockchain, and
wherein the second industrial blockchain stores data representative of a product generated using an industrial automation device, and wherein the first industrial blockchain stores data representative of a component of the product.

9. The method of claim 8,
wherein the data representative of the product comprises a quantity of the product produced by the industrial automation device, time spent in production of the product using the industrial automation device, or energy consumed by the industrial automation device in production of the product, or
wherein the data representative of the component of the product comprises a quantity of the component used in the product, or a measure of a raw material used in production of the product.

10. The method of claim 8, wherein the second industrial blockchain comprises a public blockchain.

11. The method of claim 8, wherein the second industrial blockchain comprises a private blockchain.

12. The method of claim 8, wherein the second industrial blockchain comprises a hybrid blockchain.

13. The method of claim 8, wherein the second industrial blockchain comprises a consortium blockchain.

14. The method of claim 8, wherein comprises a first blockchain technology type, and wherein the second industrial blockchain comprises a second technology type, other than the first blockchain technology type.

15. A non-transitory computer-readable medium having stored thereon instructions that, in response to execution, cause an industrial device comprising at least one processor to perform operations, the operations comprising:
using a defined conversion algorithm, converting first data from a first industrial blockchain to second data applicable to a second industrial blockchain, other than the first industrial blockchain;
writing the second data to the second industrial blockchain; and
rendering, visually or audibly, an output indicative of the writing of the second data to the second industrial blockchain,
wherein a technology type of at least the first industrial blockchain comprises a hybrid blockchain, other than a private blockchain and other than a public blockchain, and
wherein the second industrial blockchain stores data representative of a product generated using an industrial automation device, and wherein the first industrial blockchain stores data representative of a component of the product.

16. The non-transitory computer-readable medium of claim 15, wherein the data representative of the product comprises a quantity of the product produced by the industrial automation device, time spent in production of the product using the industrial automation device, or energy consumed by the industrial automation device in production of the product, or wherein the data representative of the component of the product comprises a quantity of the component used in the product, or a measure of a raw material used in production of the product.

17. The non-transitory computer-readable medium of claim 15, wherein the second industrial blockchain comprises a public blockchain.

18. The non-transitory computer-readable medium of claim 15, wherein the second industrial blockchain comprises a private blockchain.

19. The non-transitory computer-readable medium of claim 15, wherein the second industrial blockchain comprises a consortium blockchain.

20. The non-transitory computer-readable medium of claim 15, wherein comprises a first blockchain technology type, and wherein the second industrial blockchain comprises a second technology type, other than the first blockchain technology type.

\*    \*    \*    \*    \*